(12) United States Patent
Toyoshima et al.

(10) Patent No.: US 6,852,205 B1
(45) Date of Patent: Feb. 8, 2005

(54) WATER-ELECTROLYSIS-DEVICE-USE ELECTRODE PLATE, UNIT, SOLID ELECTROLYTIC MEMBRANE UNIT AND ELECTROLYTIC CELL

(75) Inventors: Manabu Toyoshima, Kobe (JP); Masaru Yonezawa, Takasago (JP); Kiyoshi Hirai, Kakogawa (JP); Akiko Miyake, Kobe (JP); Yutaka Ishii, Kobe (JP); Tsutomu Oi, Akashi (JP); Shingo Toriu, Kobe (JP)

(73) Assignee: Shinko-Pantec Co., Ltd., Hyogo-Ken (JP)

( * ) Notice: Subject to any disclaimer, the term of this patent is extended or adjusted under 35 U.S.C. 154(b) by 373 days.

(21) Appl. No.: 10/089,004

(22) PCT Filed: Sep. 25, 2000

(86) PCT No.: PCT/JP00/06603

§ 371 (c)(1),
(2), (4) Date: Mar. 22, 2002

(87) PCT Pub. No.: WO01/23644

PCT Pub. Date: Apr. 2, 2001

(30) Foreign Application Priority Data

Sep. 27, 1999 (JP) .......................... 11/272602
Oct. 21, 1999 (JP) .......................... 11/299187
Mar. 28, 2000 (JP) .......................... 2000/088293
Mar. 31, 2000 (JP) .......................... 2000/098136

(51) Int. Cl.$^7$ .............................................. C25B 11/00
(52) U.S. Cl. .................. 204/288; 204/280; 204/286.1; 204/289; 204/267; 204/268; 204/253; 204/254; 204/278.5; 29/745; 29/746
(58) Field of Search .............................. 204/280, 286.1, 204/288, 289, 267, 268, 253, 254, 278.5

(56) References Cited

U.S. PATENT DOCUMENTS

| | | | | |
|---|---|---|---|---|
| 4,017,375 A | * | 4/1977 | Pohto | 204/255 |
| 4,389,298 A | * | 6/1983 | Pellegri | 204/288 |
| 5,316,644 A | * | 5/1994 | Titterington et al. | 204/284 |
| 5,334,295 A | * | 8/1994 | Gallagher et al. | 205/783 |
| 5,424,144 A | * | 6/1995 | Woods, Jr. | 429/35 |
| 5,843,292 A | * | 12/1998 | Spiros | 204/258 |
| 5,997,283 A | * | 12/1999 | Spiros | 431/178 |

* cited by examiner

*Primary Examiner*—Bruce F. Bell
(74) *Attorney, Agent, or Firm*—Perkins Coie LLP

(57) ABSTRACT

According to the present invention, there is provided an electrode plate for a water electrolysis device, which is formed from a metal plate having such a thickness as to be capable of being press-formed, and which comprises a flat plate portion, and a peripheral edge portion positioned on the outer side of the flat plate portion and bent so that recesses and protrusions are alternately arrayed along an outer peripheral edge thereof.

32 Claims, 28 Drawing Sheets

Fig. 17(a)
Prior Art
Fig. 17(b)
Prior Art
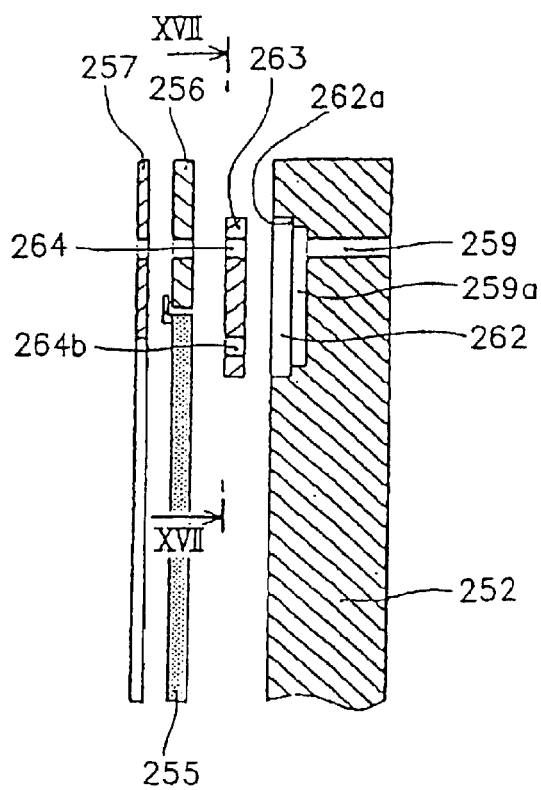
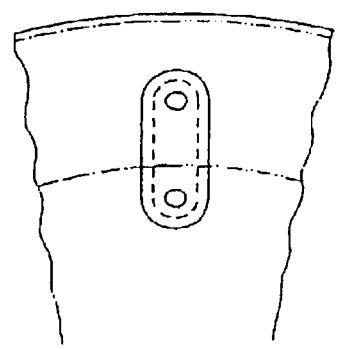

WATER-ELECTROLYSIS-DEVICE-USE ELECTRODE PLATE, UNIT, SOLID ELECTROLYTIC MEMBRANE UNIT AND ELECTROLYTIC CELL

FIELD OF THE INVENTION

This invention relates to an electrochemical cell for water electrolysis, and related parts for the electrochemical cell.

A first aspect of the present invention relates to an electrode plate for water electrolysis device, electrode plate unit and electrochemical cell. More specifically, it relates to an electrode plate and electrode plate unit used in a water electrolysis device such as a hydrogen/oxygen generator for generating oxygen gas, hydrogen gas or the like by water electrolysis, as well as an electrochemical cell using this electrode plate unit.

A second aspect of the present invention relates to a solid electrolyte membrane unit of a water electrolysis device, and an electrochemical cell. More specifically, it relates to a solid electrolyte membrane unit and an electrochemical cell used in a water electrolysis device such as a hydrogen/oxygen generator for producing high purity hydrogen and oxygen gases by water electrolysis.

Third and fourth aspects of the present invention relate to a water electrolysis device such as a hydrogen/oxygen generator for generating oxygen gas and hydrogen gas by water electrolysis or the like. More specifically, they relate to an electrode plate, electrode plate unit, electrochemical cell and the like, which are used for constituting the water electrolysis device.

BACKGROUND OF THE INVENTION

As disclosed in Japanese Patent Application Laid-open No. Hei-8-239788, a conventional hydrogen/oxygen generator is incorporated with an electrochemical cell for performing the water electrolysis, which is a main function of the device. The electrochemical cell comprises predetermined sets of solid electrolyte membrane units that are in parallel array with each other. Each of the solid electrolyte membrane units has electrode plates disposed on the opposite sides of a solid electrolyte membrane with forming spaces between them, in which one space forms an anode chamber as an oxygen generating chamber and the opposite space forms a cathode chamber as a hydrogen generating chamber. Each chamber accommodates a porous electric current supplier.

In the case of a bipolar electrochemical cell, applying a DC voltage between the outermost electrode plates of the solid electrolyte membrane units in parallel array with each other allows these electrode plates to respectively act as monopolar electrode plates of anode and cathode, and the electrode plates between the outermost electrode plates to act as bipolar electrode plates, each of which having opposite side surfaces respectively acting as anode and cathode. That is, a space between each solid electrolyte membrane and an anode side of each electrode plate forms an anode chamber, while a space between each solid electrolyte membrane and a cathode side of each electrode plate forms a cathode chamber.

For example, in electrochemical cell 151 illustrated in FIG. 6, reference numeral 152 represents a bipolar electrode plate disposed in the middle of the electrochemical cell (see FIG. 7), and reference numerals 153a and 153b respectively represent end electrode plates, that is, monopolar electrode plates respectively disposed at the opposite ends. Reference numerals 154 and 155 respectively represent solid electrolysis membranes and porous electric current suppliers. Reference numerals 156 represent annular gaskets made of silicone rubber for isolating the porous electric current suppliers 155 from the outside. Reference numerals 157 represent annular protection sheets. Also, reference numerals 158, 158a, 161 and 161a respectively represent an oxygen gas take-out conduit, an oxygen gas distributing passage, a water drainage conduit for the cathode chamber, and a water drainage passage. Although in this Figure, demineralized water feeding conduit 160, demineralized water distributing passage 160a, hydrogen gas take-out conduit 159 and hydrogen gas distributing passage 159a are not illustrated, it will become apparent that they are arranged in a similar manner as the oxygen gas take-out conduit 158 and the oxygen gas distributing passage 158a once reference is also made to FIG. 7. Reference numerals 162 in FIG. 6 respectively represent end plates, which are tightened together at corresponding peripheral edge portions, i.e., gaskets in this Figure by fastening bolts, which pass through the electrode plates and the like, so that the electrochemical cell 151 is assembled.

The porous electric current suppliers are made of a material permeable to gases such as mesh and sintered material, allowing fluid to be freely distributed passing through the side surfaces of those electric current suppliers.

The conventional electrode plate 152 is of a simple, flat plate shape, and made of a thick titanium plate since it is necessary to form the respective fluid passages 158a, 159a, 160a, 161a in the electrode plate 152 and also form gasket seats for these respective passages.

Meanwhile, the conventional electrochemical cell uses electrode plates of the above-mentioned type, which are simply flat-shaped and made of a thick titanium plate. The electrode plates of this type do not possess elasticity, so that the sealing of the oxygen generating chamber and the hydrogen generating chamber against the outside relies on elasticity of gaskets stacked on these electrode plates. Accordingly, when fastening the bolts for assembling the electrochemical cell, it is necessary to fasten them with sufficient tightening force to exert sealing ability of the gaskets. On the other hand, in the conventional electrochemical cell as illustrated in FIG. 6, the gaskets are merely stacked on the electrode plates of a simple, flat plate shape, so that excessive tightening force may cause the gaskets to deform and hence outwardly and inwardly protrude. Such deformation of the gaskets is likely to invite creep. Particularly, since the temperature of the device itself is increased due to heating by the water electrolysis during the operation of the device, the creep of the gaskets tends to be accelerated. Therefore, in order to compensate for the creep, the fastening bolts must be fastened with larger tightening force. However, this larger tightening force may further invite creep, and therefore cause difficulty in pressing on sealing surfaces at a predetermined pressing force.

The oxygen generating chamber and the hydrogen generating chamber respectively have inner pressures increased during the operation of the electrochemical cell due to generated oxygen and hydrogen gases. As described above, in the conventional electrochemical cell, the soft gaskets are merely stacked on the simply flat-shaped electrode plates, so that the gaskets may protrude to the outside subsequent to the increase in inner pressures of the hydrogen and oxygen generating chambers. Accordingly, there poses a problem that the conventional electrochemical cell is unlikely to withstand high-pressure application which involves generation of high-pressure oxygen or hydrogen gas.

The gaskets also have much larger coefficient of thermal expansion than that of other parts. As described above, the conventional electrochemical cell uses the electrode plates made of a thick titanium plate and therefore the electrode plates themselves do not possess the elasticity. As a result, the thermal expansion of the gaskets may invite the increase in the tightening force by the fastening bolts, posing various problems on the electrochemical cell.

Meanwhile, the electrode plates must maintain a good contacting relationship with adjacent porous electric current suppliers, and therefore are required to have opposite side surfaces formed with high flatness and parallelism. However, since the thick titanium plate as described above is usually manufactured by hot rolling, it resultingly has poor flatness and parallelism. This poses the necessity to perform additional flattening operation of the titanium plate before used for the electrode plate.

In this regard, there was proposed an electrode plate that is formed by a plurality of thin metal plates combined together to achieve an equivalent function as the conventional electrode plate (see the official gazette of Japanese Patent Application Laid-open No. 9-263982). However, the use of plurality of metal plates as a single electrode plate causes higher contacting electrical resistance during the operation, and therefore invites increase in supplying voltage required for operation. As a result, there may cause a problem that the energy efficiency during the operation is deteriorated.

The first aspect of the present invention was conceived in light of the problems involved in the conventional technique. Therefore, it is an object of the present invention to provide an electrode plate that is capable of improving the pressure strength, while maintaining a sufficient elasticity. It is another object of the present invention to provide an electrode plate that is capable of maintaining a high sealing effect of a gasket. It is still another object of the present invention to provide an electrochemical cell that has an improved pressure strength, gaskets with highly maintained sealing effect, and is easy to be assembled.

Also, as described in the aforesaid Japanese Patent Application Laid-open No. Hei-8-239788, the conventional hydrogen/oxygen generator is incorporated with an electrochemical cell for performing the water electrolysis, which is a main function of the device. The electrochemical cell is comprised of predetermined sets of solid electrolyte membrane units that are in parallel array with each other. The solid electrolyte membrane units each have electrode plates disposed on the opposite sides of a solid electrolyte membrane with forming spaces between them, in which one space forms an anode chamber and the opposite space forms a cathode chamber. Each chamber accommodates a porous electric current supplier.

According to a bipolar electrochemical cell, applying a DC voltage between the outermost electrode plates of the solid electrolyte membrane units in parallel array with each other allows these electrode plates to respectively act as monopolar electrode plates of anode and cathode, and middle electrode plates to act as bipolar electrode plates each having opposite side surfaces respectively acting as anode and cathode. That is, a space between each solid electrolyte membrane and an anode side of each electrode plate forms an anode chamber, while a space between each solid electrolyte membrane and a cathode side of each electrode plate forms a cathode chamber.

For example, in electrochemical cell 251 illustrated in FIG. 15, reference numeral 252 represents a bipolar electrode plate disposed in the middle portion of the electrochemical cell (see FIG. 16), and reference numerals 253a and 253b respectively represent end electrode plates (monopolar electrode plates) respectively disposed at the opposite ends. Reference numerals 254 and 255 respectively represent solid electrolysis membranes and porous electric current suppliers. Reference numerals 256 represent annular gaskets made of silicone rubber for isolating the porous electric current suppliers 255 from the outside. Reference numerals 257 represent annular protection sheets. Also, reference numerals 258, 258a, 261, and 261a respectively represent an oxygen gas take-out conduit, an oxygen gas distributing passage, a water drainage conduit for the cathode chamber and a water drainage passage. Although in FIG. 15, demineralized water feeding conduit 260, demineralized water distributing passage 260a, hydrogen gas take-out conduit 259 and hydrogen gas distributing passage 259a are not illustrated, it will become apparent that they are arranged in a similar manner as the oxygen gas take-out conduit 258 and the oxygen gas distributing passage 258a once reference is also made to FIG. 16.

The method of forming the respective conduits and passages will be appreciated once reference is also made to FIG. 17(a) illustrating a part of the electrode plate 252 in cross section. That is, near the peripheral edge of the electrode plate 252 is formed a stepped shallow groove 262 that radially extends, forming an oval shape. FIG. 17(b) is a view as viewed from the line of XVII—XVII in FIG. 17(a). Shoulder portion 262a of the stepped groove 262 is a substrate seat on which oval-shaped substrate 263 is mounted (hereinafter referred to substrate platform 262a). Thus, an oval shaped passage (represented by the hydrogen gas distributing passage 259a) is formed. This substrate 263 forms hydrogen gas take-out conduit 264 in a similar manner at a position corresponding to the hydrogen gas take-out conduit 259. Hydrogen gas introducing hole 264b for connection between the cathode chamber (space filled with the porous electric current supplier) and the hydrogen gas distributing passage 259a are formed on a portion closer to the center of the electrode plate 252 than the hydrogen gas take-out conduit 264. FIG. 17 also illustrates the porous electric current supplier 255, the gasket 256 and the protection sheet 257. In FIG. 17, although the hydrogen gas distributing passage 259a is illustrated as an example, the oxygen gas distributing passage 258a and the demineralized water distributing-passage 260a each have the same structure as that of the passage 259a except for their formed positions.

In FIG. 15, reference numerals 265 represent end plates, which are tightened together via fastening bolts (not shown) passing through the peripheral edge portions of the electrode plates and the gaskets, so that the electrochemical cell 251 is assembled.

The porous electric current suppliers 255 are made of a material permeable to gases such as mesh and sintered material, allowing fluid to be freely distributed passing through the side surfaces of those electric current suppliers 255.

Meanwhile, in the conventional technique, the anode chamber, the cathode chamber and the respective fluid passages are sealed against the outside by the flat plate gaskets 256 which are stacked on flat surfaces of the flat electrode plates (see FIG. 15). Accordingly, in the conventional technique, the gaskets must possess a predetermined elasticity.

On the other hand, during water electrolysis operation, protons are transferred in each solid electrolyte membrane, which is accordingly strongly acid. Therefore, portions to contact the solid electrolyte membrane are required to possess acid resisting property.

To produce a predetermined elasticity according to the conventional technique, a measure was taken along with the use of gaskets made of silicone rubber as the gaskets 256, preventing the gaskets from directly contacting the solid electrolyte membrane and hence preventing oxidation and corrosion of the silicone-rubber-made gaskets by placing thin annular protection sheets made of PFA (perfluoroalkoxy vinyl ether) or the like between the solid electrolyte membrane and the gaskets.

However, even the insertion of the protection sheets may cause fluid leakage if the protection sheets wrinkled or folded. To avoid this, a conventional measure necessitates selection and adoption of high-grade PFA protection sheets free of wrinkle or fold, and assembling by careful attention so as to cause no wrinkle or fold of the protection sheets. This poses a problem of increasing works and costs involved.

On the other hand, there is another option to use thick protection sheets for prevention of fluid leakage therethrough. However, the adoption of the thick protection sheets causes stepped portions between the solid electrolyte membrane and the porous electric current supplier, which may deteriorate the contactability there between and hence invite lowering of the electrolysis efficiency.

Also, in order to allow the silicon-made-gaskets to fully exhibit their sealing ability, bolts must be fastened with a predetermined torque in assembling the electrochemical cell. However, tightening force in this arrangement may cause the gaskets to deform as outwardly and inwardly protruding. Such deformation of gaskets was likely to invite creep as well as deterioration of sealing function.

Even if fastening was achieved with a proper torque in the assembling, there still remains a possibility that the gaskets protrude to the outside due to pressure caused by a generated gas. Therefore, the conventional electrochemical cell was not suitable for the application necessitating the generation of a high pressure gas.

Also, the silicone-made gaskets have much larger coefficient of thermal expansion than that of other parts. Accordingly, they increase in size during use, inviting increase in the fastening force by the bolts and hence posing various problems.

The second aspect of the present invention was conceived in light of the problems involved in the above conventional technique. Therefore, it is an object of the present invention to provide an electrochemical cell that is capable of omitting the use of conventional gaskets or protection sheets, thereby achieving improved sealability, ease of assembling, reduced number of parts, and reduction of thermal expansion due to temperature increase.

As described above, as the electrochemical cell constituting the hydrogen/oxygen generator of the conventional technique, for example, a technique as disclosed in, for example, Japanese Patent Application Laid-open No. Hei-8-239788 is known.

The electrochemical cell according to the conventional technique is comprised of predetermined sets of solid electrolyte membrane units that are in parallel array with each other. The solid electrolyte membrane units each have electrode plates disposed on the opposite sides of a solid electrolyte membrane. In each of these solid electrolyte membrane units, a space between an anode plate and the solid electrolyte membrane forms an anode chamber as an oxygen generating chamber and a space between a cathode plate and the solid electrolyte membrane forms a cathode chamber as a hydrogen generating chamber. Each chamber accommodates a porous electric current supplier.

According to the electrochemical cell made up by using a bipolar electrode, applying a DC voltage to the outermost electrode plates of the solid electrolyte membrane units in parallel array with each other (i.e., the opposite ends of the electrochemical cell ) allows these electrode plates to respectively act as monopolar electrode plates (anode and cathode), and an electrode plate at the midpoint of the electrochemical cell (midpoint between the monopolar electrode plates) to act as a bipolar electrode plate. Herein, the bipolar electrode plate is meant to be an electrode plate having opposite side surfaces respectively acting as anode and cathode. According to this arrangement, a space between an anode side of each electrode plate and each solid electrolyte membrane forms an anode chamber as an oxygen gas generating chamber, while a space between a cathode side of each electrode plate and each solid electrolyte membrane forms a cathode chamber as a hydrogen generating chamber. FIG. 27 illustrates one example of the arrangement of the conventional electrochemical cell. FIG. 28 illustrates a bipolar electrode plate constituting the electrochemical cell as illustrated in FIG. 27.

In electrochemical cell 451 as illustrated in FIG. 27, bipolar electrode plate 452 is disposed between monopolar electrode plates 453a and 453b. Between the monopolar electrode plates 453a, 453b and the bipolar electrode plate 452 are disposed solid electrolyte membranes 454, porous electric current suppliers 455, annular gaskets 456 made of silicone rubber for isolating the porous electric current suppliers from the outside, annular protection sheets 457 and the like. Specifically, the porous electric current suppliers 455 are disposed between the electrode plates 452, 453a, 453b and the solid electrolyte membranes 454, while the annular gaskets 456 are disposed between the electrode plates 452, 453a, 453b and the porous electric current suppliers 455. Also, the annular protection sheets 457 are disposed between the porous electric current suppliers 455 and the solid electrolyte membranes 454.

The bipolar electrode plate 452 forms therein oxygen gas take-out conduit 458, oxygen gas distributing passage 458a, water drainage conduit 461 for the cathode chamber, water drainage passage 461a and the like. Although the omission was made in FIG. 27, it will become apparent that this bipolar electrode plate 452 also forms therein demineralized water feeding conduit 460, demineralized water distributing passage 460a, hydrogen gas take-out conduit 459 and hydrogen gas distributing passage 459a, once reference is also made to FIG. 28.

Referring to FIG. 27, on the outer sides of the respective monopolar electrode plates 453a, 453b (sides opposite to the sides provided with the solid electrolyte membranes 154 and the like) are respectively provided end plates 462, which are fastened and fixed together by fastening bolts or the like extending through the electrode plates 452, 453a, 453b and the like. That is, the electrochemical cell 451 is assembled with the respective components fixed in position with predetermined spacing to each other between the end plates 462, 462 by using a fastening means such as fastening bolts.

The aforementioned porous electric current suppliers 455 are made of a material permeable to gases such as mesh and sintered material, allowing fluid to be freely distributed also passing through the side surfaces of these electric current suppliers 455.

The electrode plates 452, 453a, 453b each form therein passages 458a, 459a, 460a, 461a for the respective fluids. That is, this arrangement necessitates forming gasket seats for these passages 458a, 459a, 460a, 461a, so that the electrode plates 452, 453a, 453b are formed by using a relatively thick titanium plate or the like.

However, the conventional electrode cell has problems as stated below.

That is, the annular gaskets constituting the aforementioned electrochemical cell act as pressure parts for isolating the oxygen generating chamber and the hydrogen generating chamber from the outside of the electrode cell. However, since the annular gaskets themselves are soft, they may be forced out to the outside passing the fastening bolts due to increased inner pressure. Therefore, the electrochemical cell according to the conventional technique is not suitable for high-pressure application.

The annular gaskets also have larger coefficient of thermal expansion than that of other parts. Therefore, there causes large expansion of the annular gaskets during use, resulting in increased fastening forces by the fastening bolts, and hence likely causing various problems on the electrochemical cell. For example, fatigue breakdown or the like may occur on constituent elements of the electrochemical cell.

The electrode plates and other components of the conventional electrode cell are usually exposed to ambient air. Therefore, the electrochemical cell of the conventional technique had a problem of poor weather resistance.

The third aspect of the present invention was conceived in light of the problems involved in the above conventional technique. It is an object of the present invention to provide an electrochemical cell that has made pressure resistance high enough to withstand the high pressure, and is so arranged as to maintain a high sealability between the adjacent components. It is another object of the present invention to provide an electrochemical cell that has improved weather resistance and therefore can be used for a long period of time.

The electrochemical cell according to the conventional technique also has problems as stated below.

That is, in the electrochemical cell so arranged as described above, the bolts as fastening means must be sufficiently tightened for assembling so as to exhibit a proper sealing ability of the annular gaskets. On the other hand, care also has to be taken so as not to fasten the bolts with excessive fastening force and hence protrude the annular gaskets outwardly and inwardly. Also, the operation of the device is accompanied by temperature increase, which causes creep of the annular gaskets and hence lowered sealing effect. Accordingly, additional fastening operation will be needed. However, creep is caused every time the fastening operation is done, and therefore there poses a problem that a sealing surface pressure is hardly maintained at a constant level during the assembling of the electrochemical cell.

In order to improve the electrolysis efficiency, the electrode plates must maintain proper contacting relationship with the adjacent porous electric current suppliers, as well as uniform contacting relationship with the solid electrolyte membranes. These components must be disposed with predetermined spacing from each other so as to have a proper contacting relationship with each other. However, the operation causes thermal expansion and thermal contraction of the electrochemical cell. As a result, it is hard to properly maintain a predetermined distance between the adjacent components for a long period of time.

As described above, it is hard to keep a sealing surface pressure and distance between the adjacent components constant. Particularly, such as uneven surface pressure causes a problem to deteriorate the electrolysis efficiency.

The fourth aspect of the present invention was conceived to address the problems involved in the above conventional technique. It is an object of the present invention to provide an electrochemical cell that is so arranged as to have the respective components of the electrode plate unit and the electrochemical cell substantially equally disposed or contacting surface pressure substantially evenly applied on the whole surfaces thereof, thereby achieving even spacing between the components and even sealing surface pressure, and hence preventing deterioration of the electrolysis efficiency.

SUMMARY OF THE INVENTION

According to a first aspect of the present invention, there is provided an electrode plate, which is formed from a metal plate and which includes a flat plate portion, and a peripheral edge portion positioned on the outer side of the flat plate portion and bent so that recesses and protrusions are alternately arrayed along an outer peripheral edge thereof.

Accordingly, the electrochemical cell, in which several electrode plates are stacked to each other with the protrusions of each electrode plate abutting against the recesses of another electrode plate adjacent to the one electrode plate, forms a rigid peripheral side wall through the abutting engagement between the recesses and the protrusions, and hence improves the pressure strength in spite of the use of the electrode plates formed from the metal plate. In addition, the respective electrode plates of this electrochemical cell can compensate increased surface pressure due to thermal expansion, since the electrode plates constituting the electrochemical cell have an effective elasticity.

In comparison with an electrochemical cell with thin metal plates stacked to each other, it is unlikely to cause a problem such as voltage loss on contacting portions of the adjacent electrode plates, so that a deterioration of the energy efficiency in a water electrolysis device using the electrode plates of the present invention can be prevented.

The metal plate preferably has such a thickness as to be capable of being press-formed. Whereby, the electrode plate can easily be formed at low cost by press-forming.

A groove for receiving a sealing member is preferably formed between the flat plate portion and the peripheral edge portion of the electrode plate along the peripheral edge portion by bending (e.g., pressing). With this arrangement, the sealing member fitted in the groove is unlikely to be tightened with a force larger than needed and deformed to an unreasonable shape. As a result, it is possible to effectively prevent creep of the sealing member, and hence maintain a high sealing effect.

The flat plate portion is preferably positioned substantially along the center of the width of the electrode plate defined by bottoms of the recesses and tops of the protrusions of the electrode plate. With this arrangement, when the water electrolysis device is assembled so as to form spaces for oxygen generation and hydrogen generation on the opposite sides of the flat plate portion, it is easy to dispose necessary parts such as electric current suppliers in the oxygen and hydrogen generation spaces. In addition, these parts are prevented from being compressed to a size smaller than needed.

According to the first aspect of the present invention, there is also provided an electrode plate unit, which includes an electrode plate that is formed from a metal plate and including a flat plate portion, a peripheral edge portion positioned on the outer side of the flat plate portion and bent so that recesses and protrusions are alternately arrayed along an outer peripheral edge of the electrode plate, a groove formed by bending (e.g., pressing) between the flat plate portion and the peripheral edge portion from even to uneven in such a manner as to extend along the peripheral edge portion, a sealing member mounted in the groove of the electrode plate, an anode-side electric current supplier and a cathode-side electric current supplier respectively disposed on opposite side surfaces of the flat plate portion of the electrode plate, and anode-side spacers and cathode-side spacers, the former disposed with the anode-side electric current supplier positioned therebetween and the latter disposed with the cathode-side electric current supplier positioned therebetween as viewed in a plane view. The electrode plate and both the spacers respectively form holes respectively forming an oxygen gas passage, a hydrogen gas passage and an electrolyzed water passage. The anode-side spacer has opposite side surfaces on which sealing grooves are respectively formed surrounding one of the holes, which forms the hydrogen gas passage. The cathode-side spacer has opposite side surfaces on which sealing grooves are respectively formed surrounding those of the holes, which respectively form the oxygen gas passage and the electrolyzed water passage.

Accordingly, the electrochemical cell, which has plural electrode plates stacked to each other with the protrusions of one electrode plate abutting against the recesses of another electrode plate adjacent to the one electrode plate, has a rigid peripheral side wall through the abutting engagement between the recesses and the protrusions, and hence improves the pressure resisting property in spite of the use of the electrode plates formed from the metal plate. In addition, this electrochemical cell can compensate increase in surface pressure for the fastening due to thermal expansion. The sealing member fitted in the groove is unlikely to be tightened with a force larger than needed and to be deformed to an unreasonable shape. Accordingly, it is possible to effectively prevent creep of the sealing member, and hence maintain a high sealing effect. Since the respective constituent parts can easily be positioned, an assembling efficiency can be improved.

The metal plate preferably has such a thickness as to be capable of being press-formed. Whereby, the electrode plate can easily be formed at low cost by press-forming.

The anode-side spacer has a side surface contacting the flat plate portion of the electrode plate, preferably forming thereon an oxygen gas groove for connection between the hole forming the oxygen gas passage and the anode-side electric current supplier, and an electrolyzed water groove for connection between the hole forming the electrolyzed water passage and the anode-side electric current supplier. The cathode-side spacer has a side surface contacting the flat plate portion of the electrode plate, preferably forming thereon a hydrogen gas groove for connection between the hole forming the hydrogen gas passage and the cathode-side electric current supplier.

With the electrode plate unit having the above arrangement, it is possible to effectively prevent leakage of gas or water, with the result that high-purity hydrogen gas and oxygen can be produced.

According to the first aspect of the present invention, there is also provided an electrochemical cell that includes a plurality of the electrode plate units and solid electrolyte membranes interposed between adjacent electrode plate units, in which the plurality of the electrode plate units are disposed in a stacking direction, and an electrode plate of one of the adjacent electrode plate units has recesses and protrusions respectively facing recesses and protrusions of the opposite one of the adjacent electrode plate units.

It is also possible to produce the aforementioned functions and effects by the above electrochemical cell.

According to the first aspect of the present invention, there is also provided an electrochemical cell that includes a solid electrolyte membrane and electrode plates aligned in a stacked arrangement with the solid electrolyte membrane between the electrode plates, and electric current suppliers disposed between the solid electrolyte membrane and the electrode plates, in which the electrochemical cell has a side portion having a honeycomb structure formed by peripheral edge portions of the electrode plates.

In the electrochemical cell having the above arrangement, while using the electrode plates having elasticity, it is possible to improve the pressure resisting property of the electrochemical cell itself. Therefore, it is possible to effectively compensate increase in surface pressure for the fastening due to thermal expansion, while maintaining a sufficient pressure strength.

According to a second aspect of the present invention, there is provided a solid electrolyte membrane unit that includes a solid electrolyte membrane, a pair of electrode plates respectively disposed on the opposite sides of the solid electrolyte membrane, porous electric current suppliers respectively disposed between each of the pair of electrode plates and the solid electrolyte membrane, an anode-side annular member and a cathode-side annular member respectively forming therein center holes for receiving the porous electric current suppliers and defining an anode chamber and a cathode chamber on the opposite sides of the solid electrolyte membrane, and seal rings for isolating the anode chamber and the cathode chamber from the outside. At least portions of the anode-side annular member and the cathode-side annular member contacting the solid electrolyte membrane possess acid resisting property. The seal rings are disposed in seal ring grooves formed on side surfaces of the anode-side annular member and the cathode-side annular member.

In the unit having the above arrangement, the following effects are produced, as compared with a conventional unit, in which sealing was achieved by a flat plate-shaped silicone gasket. That is, since the seal rings are disposed within the grooves formed on the annular members, the seal rings can easily be placed in position, thereby contributing to improved assembling efficiency of the electrochemical cell by connecting the units together. Since the seal rings are accommodated within the grooves, the seal rings are unlikely to protrude to the outside when they are fastened for assembling the electrochemical cell. Accordingly, it is possible to effectively prevent the creep of the seal rings, while producing a proper sealing effect. This enables the electrochemical cell to be efficiently operated under high-pressure, in which high-pressure hydrogen gas or oxygen gas is generated.

Since a conventional flat plate-shaped silicone rubber gasket with a remarkably large coefficient of thermal expansion is not used, it is possible to effectively avert a problem due to the thermal expansion during operation, while omitting the necessity of using protection sheets made of PFA, which were conventionally required. As a result, the cost can be reduced by efficient assembly and a reduced number of parts.

Also, the seal rings used instead of flat plate-shaped gaskets omit the necessity of the application of a great fastening torque required for clamping the entirety of the gaskets of a flat plate shape at the time of assembling the electrochemical cell. As a result, assembling efficiency is improved.

Preferably, the solid electrolyte membrane, the electrode plates and the annular members respectively have peripheral edge portions positioned radially outward than the porous electric current suppliers, which peripheral edge portions respectively forming therein first to third openings forming fluid conduits for feeding demineralized water, taking out oxygen gas and taking out hydrogen gas. The anode-side annular member forms therein first and second fluid passages respectively for connection between the first opening and the anode chamber and between the second opening and the anode chamber. The cathode-side annular member forms therein a third fluid passage for connection between the third opening and the cathode chamber.

With the above arrangement, the necessity to work an electrode plate with a high precision, which was required for a conventional electrode plate with fluid passages formed therein, can be omitted. As a result, the manufacturing cost can be reduced.

Preferably, the first and second fluid passages are formed on one side surface of the anode-side annular member, and the third fluid passage is formed on one side surface of the cathode-side annular member. Whereby, the annular members can have a simplified structure.

Preferably, the sealing grooves of the anode-side annular member are formed on opposite side surfaces of the anode-side annular member so as to pass on the radially outer side of the first and second openings, and on the radially inner side of the third opening. The anode-side annular member forms on opposite side surfaces thereof sealing grooves of smaller diameter, surrounding the third opening, and seal rings of smaller diameter are respectively fitted in the sealing grooves of smaller diameter. The sealing grooves of the cathode-side annular member are formed on opposite side surfaces of the cathode-side annular member so as to pass on the radially inner side of the first and second openings, and on the radially outer side of the third opening. The cathode-side annular member forms on opposite side surfaces thereof sealing grooves of smaller diameter, respectively independently surrounding the first and second openings, and seal rings of smaller diameter are respectively fitted in the sealing grooves of smaller diameter. At least some of the seal rings fitted in the sealing grooves of the anode-side annular member and the cathode-side annular member contacting the solid electrolyte membrane possess acid resisting property.

In a different embodiment, the sealing grooves of the annular members are formed on opposite side surfaces of each of the annular members so as to pass on the radially outer side of the first to third openings. The anode-side annular member forms on opposite side surfaces thereof sealing grooves of smaller diameter, surrounding the third opening, and seal rings of smaller diameter are respectively fitted in the sealing grooves of smaller diameter. The cathode-side annular member forms on opposite side surfaces thereof sealing grooves of smaller diameter, respectively independently surrounding the first and second openings, and seal rings of smaller diameter are respectively fitted in the sealing grooves of smaller diameter. At least some of the seal rings fitted in the sealing grooves of the anode-side annular member and the cathode-side annular member contacting the solid electrolyte membrane possess acid resisting property.

Preferably, the porous electric current suppliers respectively have porous bodies and reinforcing rings radially outwardly extending from the bodies. At least portions of the porous bodies and the reinforcing rings contacting the solid electrolyte membrane possess acid resisting property.

More preferably, the center hole of the anode-side annular member has a rectangular shape with a substantially equal width throughout the length from the first opening to the second opening, and one of the porous electric current suppliers received within the center hole of the anode-side annular member has substantially the same shape as that of the center hole.

With the above arrangement, a substantially uniform flow rate of demineralized water flowing in the cathode chamber can be achieved throughout the entire regions of the electric current suppliers, and efficiency in generation of oxygen gas and hydrogen gas can be improved. Further, through forming those into a rectangular shape, material loss can be prevented, thereby improving a yield ratio in manufacturing.

According to a third aspect of the present invention, there is provided an electrochemical cell that includes a solid electrolyte membrane, electrode plates disposed on the opposite sides of the solid electrolyte membrane, electric current suppliers interposed between the solid electrolyte membrane and the electrode plates, and shims disposed between the electrode plates so as to adjust contacting relationships between the solid electrolyte membrane and the electric current suppliers.

"Shim" herein referred is a thin plate (e.g., a plate of such as copper, steel, plastic, rubber or synthetic resin) placed (or interposed) for adjustment of a height or clearance. According to the electrochemical cell having this arrangement, the contacting relationship between the solid electrolyte membrane and the electric current suppliers (that is, a distance between the solid electrolyte membrane and each of the electric current suppliers) is regulated by the shims provided between the electrode plates. Accordingly, even if bolts as fastening means are sufficiently tightened for assembling the electrochemical cell, the distances between the respective elements are regulated by the shims. As a result, the sealing members such as gaskets are unlikely to be excessively deformed, and hence creep of the gaskets or the like is unlikely to occur to such an extent as does in the conventional arrangement. Therefore, it is possible to effectively alleviate likeliness of leakage or the like, and maintain a constant sealing surface pressure. That is, the gaskets or the like as elastic members are provided within the electrode plates for the prevention of fluid leakage or the like, and these gaskets or the like have non-uniform compression rate. Accordingly, it tends to have non-uniform clearances between the adjacent electrode plates in each stage. However, the shims provided in the respective stages can easily maintain uniform clearances thanks to a predetermined rigidity of the shims.

The shims each are preferably formed into an edgeless-shape so as to extend throughout the entire peripheral edge portion of each of the electrode plates. The edgeless-shape referred herein is a continuous ring shape without an end, and such a shape is not necessarily limited to a circle or angled shape. Any shape may be employed, provided that it can be installed at a proper position on the peripheral edge portion of each electrode plate.

According to the above preferred arrangement, the edgelessly shaped shims having a predetermined thickness are interposed in the clearances (peripheral edge portions) along the entire peripheries of the multi-stacked electrode plates. Whereby, uniformalizing of the clearances between the electrode plates can be more facilitated. Also, a predetermined surface pressure for the fastening can be applied to the solid electrolyte membrane, the electric current suppliers and the like, thereby achieving an entirely uniformalized surface pressure.

The shims constituting the electrochemical cell according to the third aspect of the present invention are not limited to the aforementioned shape (edgeless shape). For example, it is possible to employ linear shims. In assembling the electrochemical cell, the shims may be disposed on opposite sides of each electrode plate along the peripheral edge portion.

The solid electrolyte membrane, the electrode plates, the electric current suppliers and the shims are preferably stacked to each other between two end plates. The end plates are fastened to each other by using bolts and nuts adapted to the bolts, and buffer members exerting biasing forces are provided between the nuts and the end plates.

With the above arrangement, the buffer members provided on the bolts impart biasing forces to the bolts and the nuts, so that an originally applied surface pressure for the fastening and the like can effectively be maintained even if the electrochemical cell is used for a long period of time.

As each of the buffer members, which constitute the electrochemical cell of the present invention, at least one of a coned disc spring and a coil spring is used.

According to the third aspect of the present invention, there is also provided a method of assembling the electrochemical cell that includes stacking a solid electrolyte membrane, electrode plates, electric current suppliers and shims to each other between two end plates, and fastening between the two end plates by bolts while applying a uniform pressing force on the two end plates by a pressing machine.

According to the method of assembling the electrochemical cell, the use of the pressing machine for assembling the electrochemical cell achieves ease of the application of a predetermined fastening pressure on the surfaces of the electric current suppliers, the solid electrolyte membrane and the like, as well as enabling the pressure to act on the whole surface of each element. Whereby, it is possible to easily achieve the uniformizing of the fastening force on the whole surfaces of the respective elements.

Nuts adapted to the bolts and buffer members having biasing force disposed between the nuts and the end plates are preferably used for the fastening of the bolts The electrochemical cell manufactured by this preferred method can maintain an originally applied fastening force on the surfaces through the biasing force imparted to the bolts and the nuts by the buffer members provided on the bolts, even if the electrochemical cell is used for a long period of time.

According to a fourth aspect of the present invention, there is provided an electrochemical cell that includes a solid electrolyte membrane, electrode plates disposed on the opposite sides of the solid electrolyte membrane, and electric current suppliers interposed between the solid electrolyte membrane and the electrode plates. The electrode plates respectively form on portions in the proximity of the peripheral edge portions thereof recessed grooves in which sealing members are disposed, and the sealing members disposed in the grooves are shaped to have predetermined portions adapted to protrude from the grooves towards the inner side and outer side of the electrochemical cell when the electrode plates are stacked to each other via the sealing members.

With the above arrangement, since the sealing members are shaped to have predetermined portions adapted to protrude towards the inner side and outer side of the electrochemical cell for arranging the electrochemical cell, the electrochemical cell can withstand a high pressure caused within the electrochemical cell during the operation or the like thanks to the self-fastening action by the protrusions, and prevent leakage of hydrogen, oxygen and demineralized water. Thus, according to the present invention, it is possible to manufacture the electrochemical cell so arranged as to maintain a high sealing property between the respective elements, while improving the pressure strength.

The sealing members are preferably formed so as to have shoulder portions adapted to protrude towards the inner side and outer side of the electrochemical cell, when the sealing members have been fitted into the grooves. Specifically, the sealing members each preferably have a diamond shape or reversed trapezoidal shape in cross section.

According to the fourth aspect of the present invention, there is also provided an electrochemical cell that includes a solid electrolyte membrane, electrode plates disposed on the opposite sides of the solid electrolyte membrane, and electric current suppliers interposed between the solid electrolyte membrane and the electrode plates. The electrode plates respectively have outer peripheries secured to each other with a resin material.

With the above arrangement, the whole outer peripheries secured to each other with the resin material can prevent leakage of hydrogen, oxygen and demineralized water to the outside of the electrochemical cell. Also, the electrode plates are prevented from being directly exposed to ambient air. As a result, it is possible to improve weather resistance of the electrochemical cell and hence long lifetime of the electrochemical cell. Also, even if the thermal expansion or the like is caused to the electrochemical cell during the use, the resin material exerts a resisting force against the change of the thermal expansion or the like of the constituent elements since they are secured to each other with the resin material. Thus, according to the electrochemical cell of the present invention, it is possible to effectively prevent fatigue failure or the like in the respective elements constituting the electrochemical cell.

The resin material is preferably at least one selected from epoxy resin, polyester resin and silicone resin.

More preferably, shims are provided between the electrode plates so as to adjust contact situations between the solid electrolyte membrane and the electric current suppliers.

"Shim" herein referred is a thin plate (e.g., a plate of such as copper, steel, plastic, rubber or synthetic resin) placed (or interposed) for adjustment of a height or clearance.

With this preferred arrangement, it is possible to adjust the contacting relationships between the solid electrolyte membrane and the electric current suppliers, while achieving a pressure-resisting structure as described above. As a result, it is possible to achieve improved electrolysis efficiency, long lifetime and the like.

The shims each are preferably formed into an edgeless-shape so as to extend throughout the whole peripheral edge portion of each of the electrode plates. The edgeless-shape referred herein is a continuous ring shape without an end, and such a shape is not necessarily limited to a circle or angled shape. Any shape may be employed, provided that it can be installed at a proper position on the peripheral edge portion of each electrode plate.

Preferably, the solid electrolyte membrane, the electrode plates, the electric current suppliers and the shims are stacked to each other between two plates. The end plates are fastened to each other by using bolts and nuts adapted to the bolts, while buffer members having biasing forces are provided between the nuts and the end plates.

With this preferred arrangement, it is possible to effectively maintain a contacting surface pressure for the fastening originally applied for the electrochemical cell by means of the buffer members, as well as producing various effects.

More preferably, the buffer members each comprise at least one of a coned disc spring and a coil spring.

BRIEF DESCRIPTION OF THE DRAWINGS

FIG. 17(a) is a cross section illustrating an essential portion of the conventional electrode plate of FIG. 16. FIG. 17(b) is a view as viewed from line XVII—XVII in FIG. 17(a).

DETAILED DESCRIPTION OF THE PREFERRED EMBODIMENTS

Embodiment 1

Preferred embodiments of the first aspect of present invention will be described with reference to the drawings.

Figure 1A:
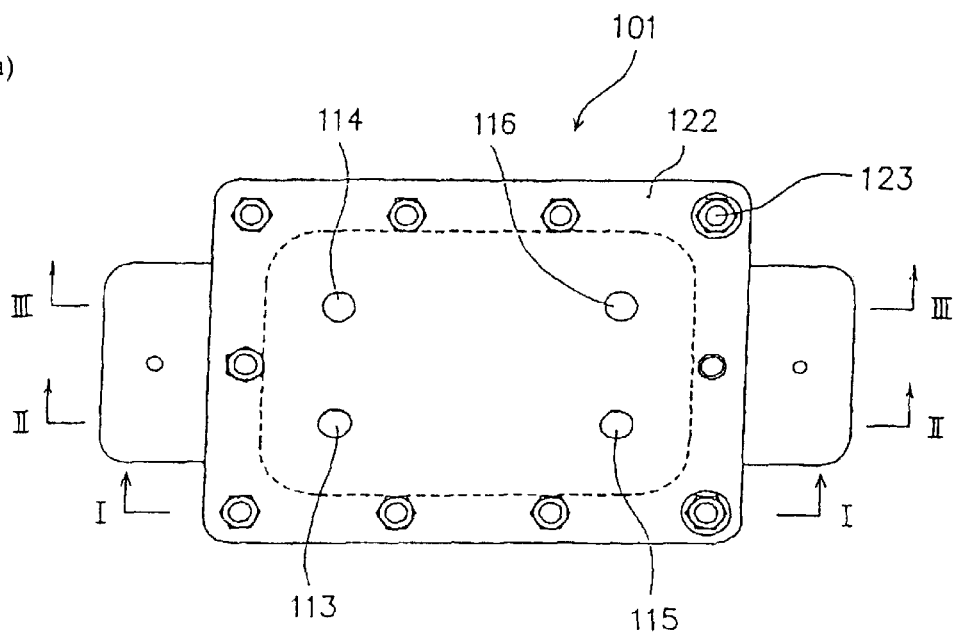
FIG. 1(a) is a plane view illustrating one embodiment of an electrochemical cell according to a first aspect of the present invention.
Figure 1B:
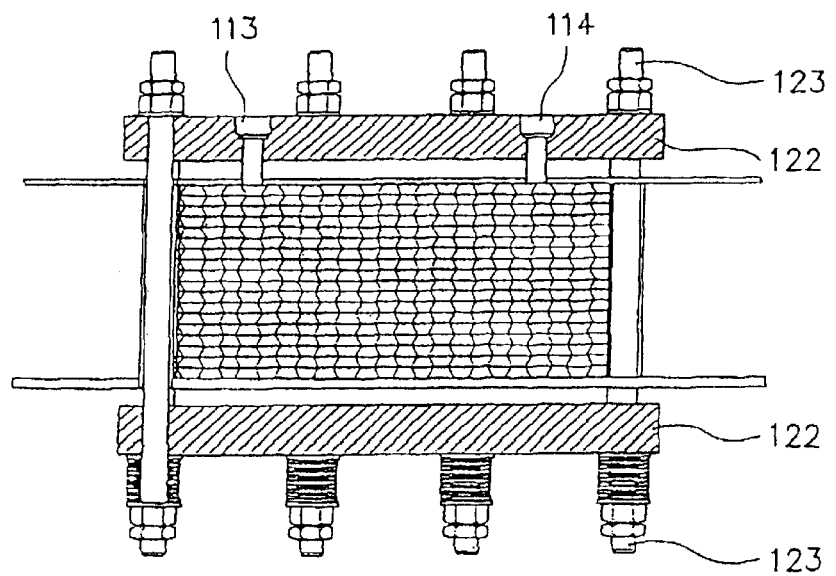
FIG. 1(b) is a side view with a partial cross section as viewed from line I—I in FIG. 1(a), illustrating a part of FIG. 1(a) in section.
Figure 2:
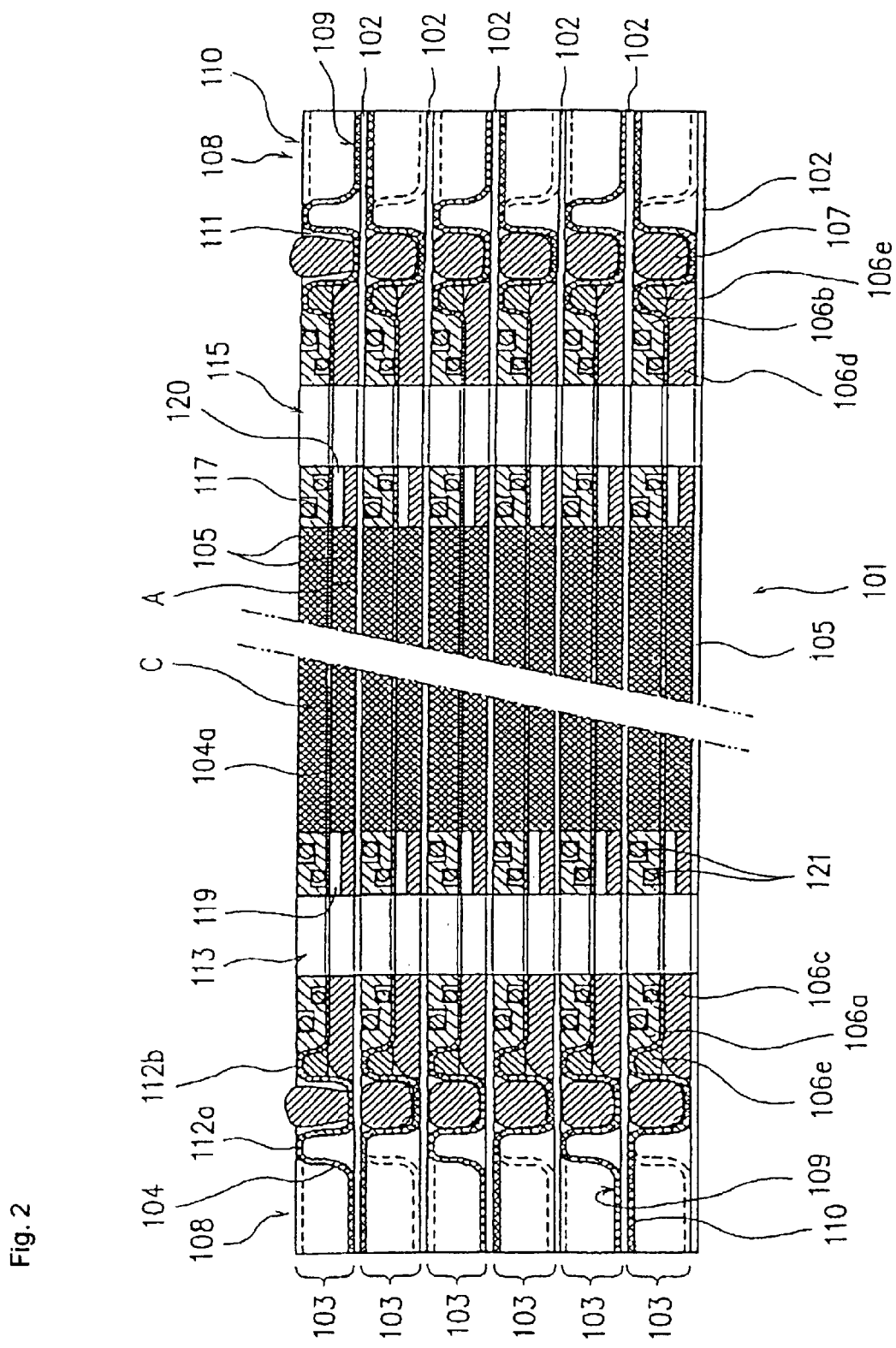
FIG. 2 is a cross section of an essential portion in a view taken along line II—II in FIG. 1(a).
Figure 3:
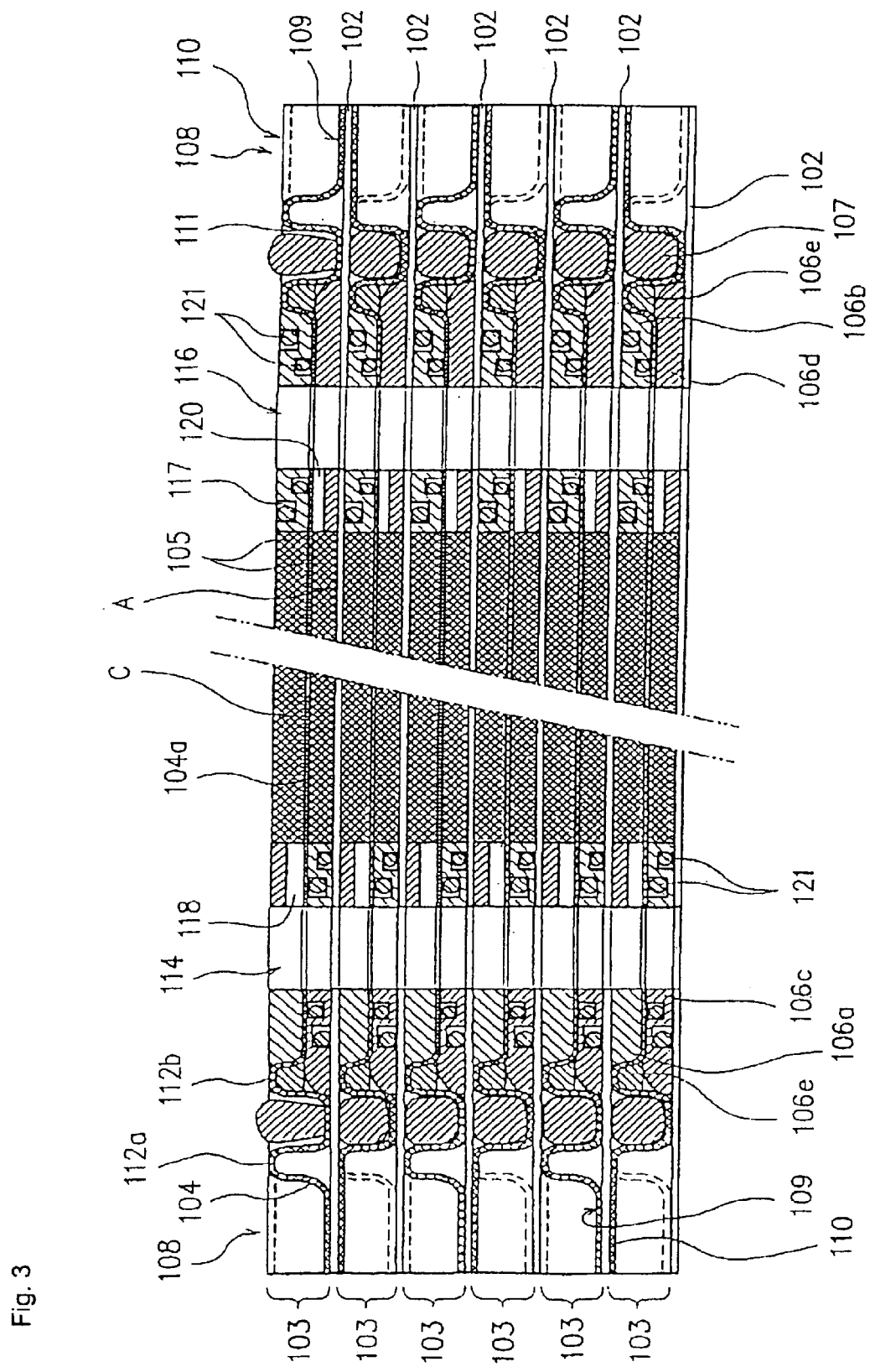
FIG. 3 is a cross section of an essential portion in a view taken along line III—III in FIG. 1(a).
Figure 4C:
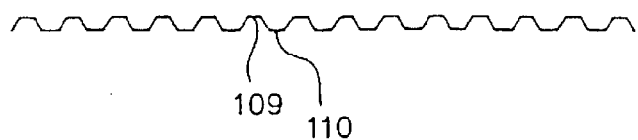
FIGS. 4(b) and 4(c) are cross sections respectively taken along lines IV(B)—IV(B) and IV(C)—IV(C) in FIG. 4(a).
Figure 4A:
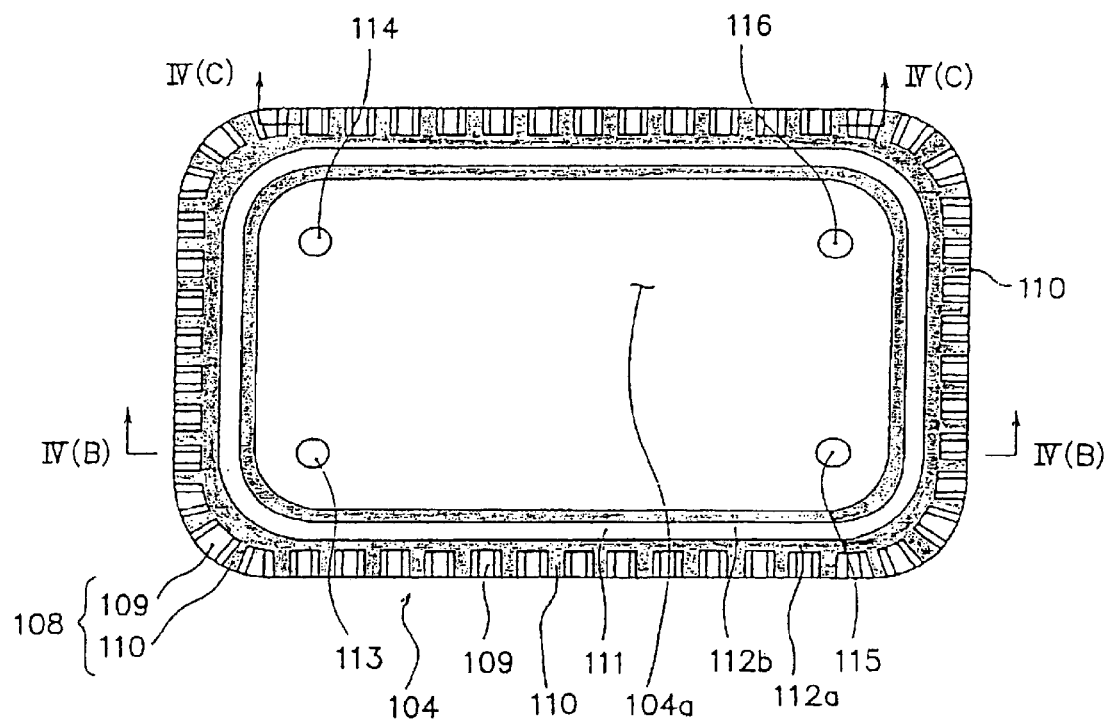
FIG. 4(a) is a plane view illustrating one embodiment of the electrode plate according to the first aspect of the present invention.
Figure 4B:
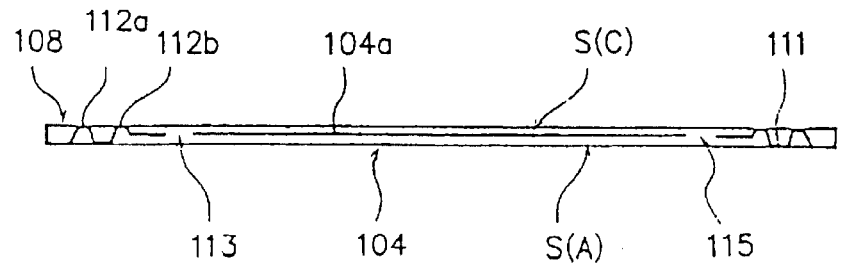
Figure 5:
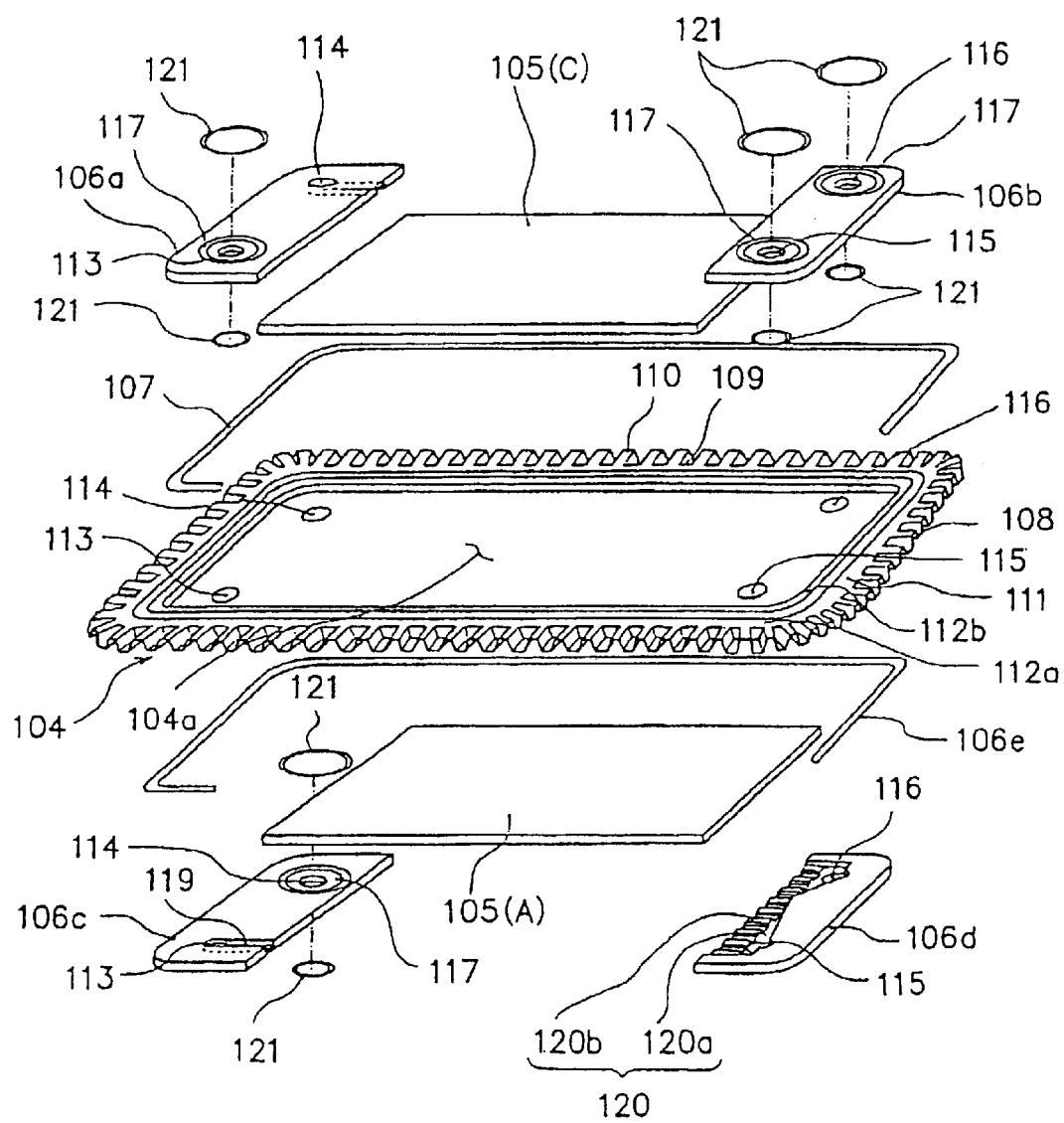
FIG. 5 is a perspective view of one embodiment of an electrode plate unit prior to the assembling thereof according to the first aspect of the present invention.
Figure 6:
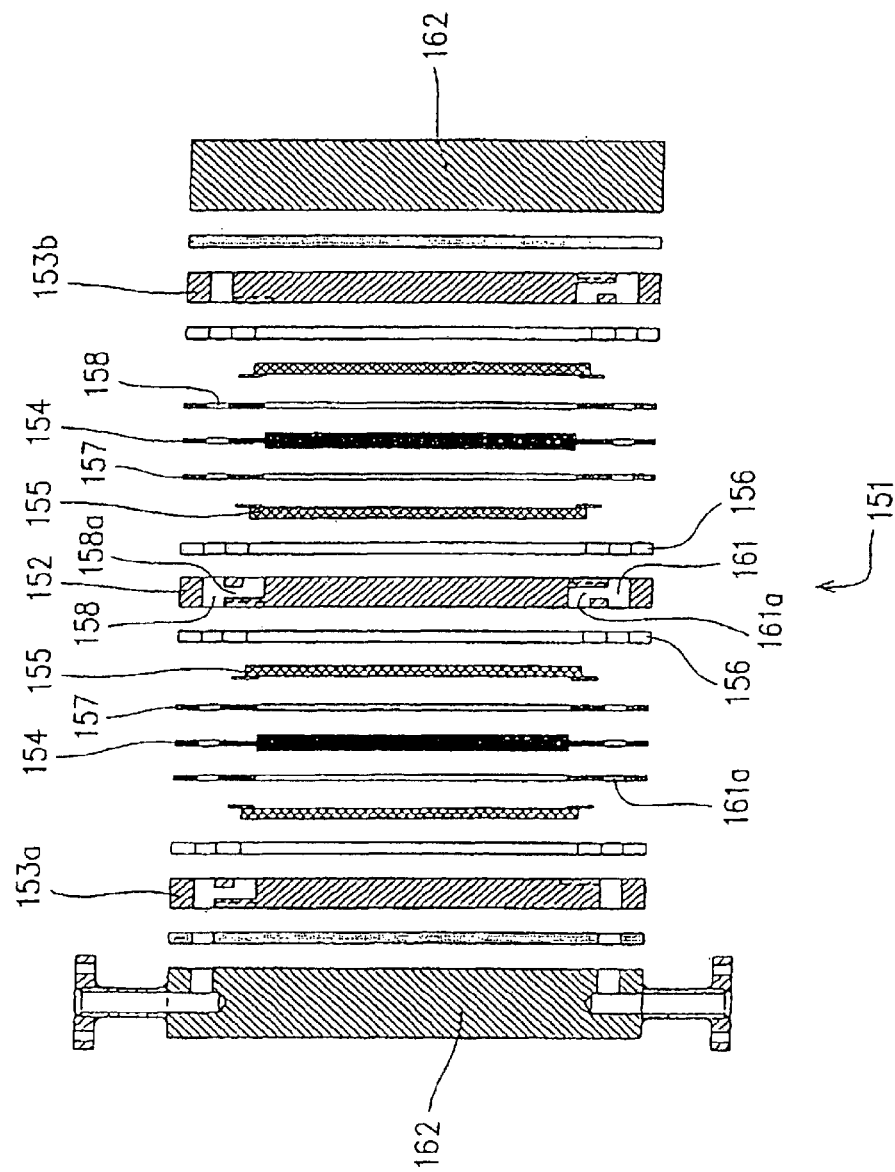
FIG. 6 is a cross section of one embodiment of a conventional electrochemical cell prior to the assembling thereof.
Figure 7:
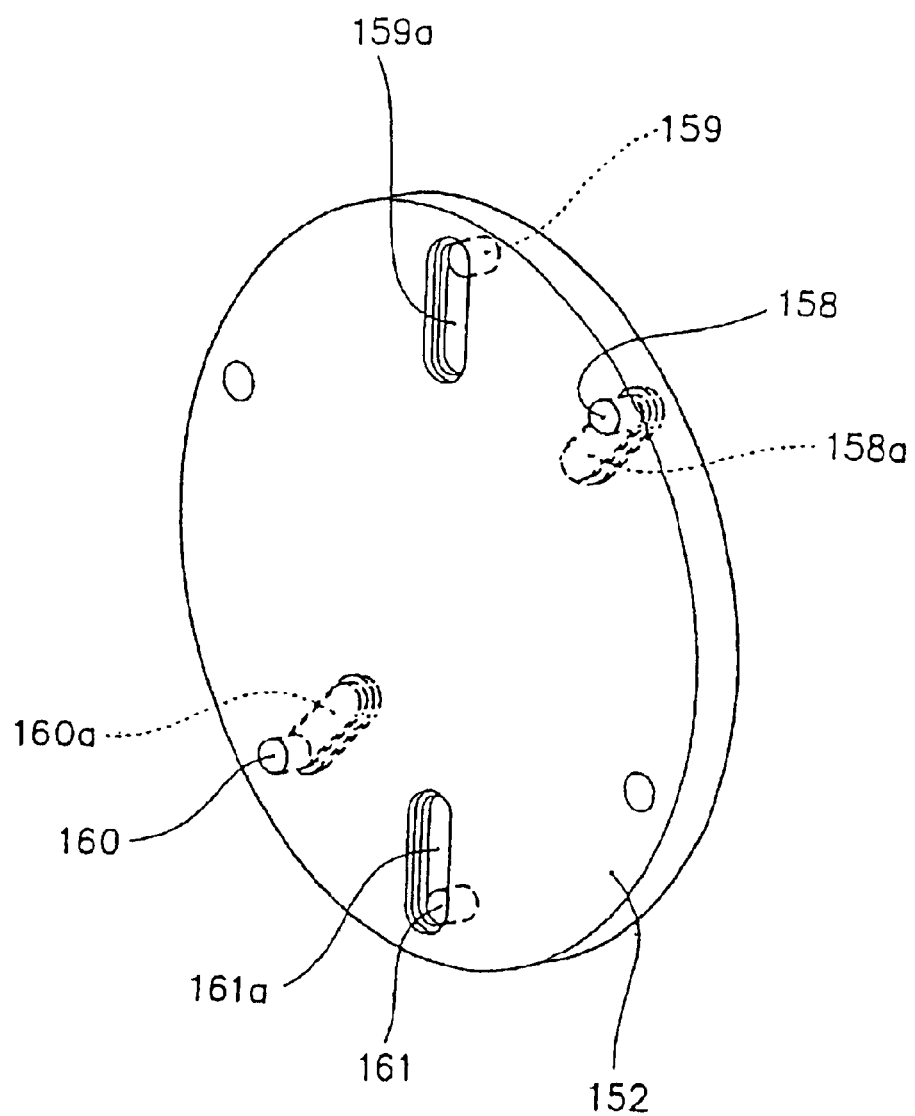
FIG. 7 is a perspective view illustrating one embodiment of a bipolar electrode plate positioned at the intermediate portion of the conventional electrochemical cell.

FIG. 1(a) is a plane view illustrating one embodiment of the electrochemical cell according to the first aspect of the present invention. FIG. 1(b) is a side view with a partial cross section as viewed from line I—I in FIG. 1(a), illustrating a part (a honeycomb-like peripheral wall portion) of FIG. 1(a). FIG. 2 is a cross section of an essential portion in a cross-sectional view taken along line II—II in FIG. 1(a). FIG. 3 is a cross section illustrating an essential portion in a cross-sectional view taken along line III—III in FIG. 1(a). FIG. 4(a) is a plane view illustrating one embodiment of the electrode plate according to the first aspect of the present invention. FIGS. 4(b) and 4(c) are cross sections respectively taken along lines IV(B)—IV(B) and IV(C)—IV(C) in FIG. 4(a). FIG. 5 is a perspective view of one embodiment of the electrode plate unit prior to the assembling thereof according to the first aspect of the present invention.

As illustrated in FIGS. 1–3, electrochemical cell 101 of this embodiment has a stacked structure made up by a predetermined number of solid electrolyte membranes 102 and electrode plate units 103 that are alternately positioned with each of the solid electrolyte membranes positioned between adjacent electrode plate units 103 on the opposite sides of each membrane. The electrochemical cell 101 also includes a pair of end plates 122 disposed on the opposite ends of the stacked structure made up of the solid electrolyte membranes 102 and the electrode plate units 103, so that the electrochemical cell 101 is assembled by fastening the pair of end plates 122 by means of fastening bolts 123.

The electrode plate units 103 each include electrode plate 104 made of an electric conductive material, porous electric current suppliers 105 disposed on the opposite sides of the electrode plate 104, spacers 106 and sealing member 107. Reference numerals 113 and 114 respectively represent oxygen flowing passage and hydrogen flowing passage for taking out the generated oxygen gas and hydrogen gas therethrough, as later described. Reference numeral 115 represents demineralized water flowing passage for feeding demineralized water for electrolytic process.

The electrode plate 104 is illustrated in FIG. 4 in more detail. The electrode plate 104 has such a thickness as to be capable of being press-formed. It preferably has a thickness of 0.3 mm–0.8 mm, and more preferably 0.5 mm–0.6 mm. Preferably, the electrode plate 104 is formed by pressing a titanium plate.

The electrode plate 104 has peripheral edge portion 108 with alternately arrayed recesses 109 and protrusions 110. Both the recesses 109 and the protrusions 110 each have a shape cut along the center line connected between the opposite corners of an equilateral hexagon in the front view (kind of trapezoid) (see also FIG. 4(*c*)). Although such a trapezoidal shape is desirable in light of the formability, they are not limited to such a shape. For example, wave shape with semi-circular recesses and protrusions alternatively arrayed, or other shapes different from the above such as a trapezoidal or rectangular shape can be employed.

As illustrated in FIG. 1(*b*), the electrochemical cell 101 is assembled in such a manner as to have the protrusions 110 of one electrode plate 104 abutting recesses 109' of adjacent electrode plate 104', and define clearances between the recesses 110 of the one electrode plate 104 and protrusions 110' of the adjacent electrode plate 104'. That is, the electrochemical cell 101 is assembled with a side portion having a honeycomb structure (hexagonal honeycomb structure in this embodiment) formed by the peripheral edge portions of the plural electrode plates. Whereby, it is possible to maintain or improve the pressure resisting property of the electrochemical cell, while using an electrode plate thinner than a conventional electrode plate. This electrode plate 104 can achieve equalization of a sealing surface pressure of the electrochemical cell because it has elasticity along the stacking direction of the electrochemical cell 101.

Preferably, the electrode plate 104 is formed in such a manner as to have the recesses 109 and the protrusions 110 arrayed along one side of the electrode plate 104 displaced by half-pitch from those of the opposite side, as illustrated in FIG. 4(*a*). With this arrangement, the aforesaid honeycomb structure can be obtained by using a single type of the electrode plates 104 that are turned by 180 degrees and overlapped to each other. Therefore, the electrode plates 104 can be uniformalized, thereby achieving a lowered manufacturing cost and case of inventory management.

The recesses 109 and the protrusions 110 are formed within a predetermined dimensional range of between the outer peripheral edge and an inward portion of each electrode plate 104. The electrode plate 104 also forms groove 111 on the inner side of the array of the recesses 109 and the protrusions 110 (peripheral edge portion 8) for the sealing member 107 extending along the peripheral edge. On the outer and inner sides of the groove 111 are formed outer raised line 112*a* and inner raised line 112*b* by bending. The groove 111 and raised lines 112*a*, 112*b* are press-formed in the same manner as the recesses 109 and the protrusions 110.

On the inner side than the inner raised line 112*b* is formed a flat plate portion 104*a*. The flat plate portion 104*a* is positioned substantially at the center between the bottoms of the recesses 109 and the tops of the protrusions 110 in the thickness direction of the electrode plate 104 (see FIG. 4(*b*)). With this arrangement, the flat plate portion 104*a* has a first side defining tray-like space S surrounded by the inner raised line 112*b* and a second side defining another tray-like space S surrounded by the groove 111 (see FIG. 4(*b*)). That is, among the respective constituent parts of the electrode plate 104, the protrusions 110, the outer raised line 112*a* and the inner raised line 112*b* have tops positioned at the same height with respect to the width direction of the electrode plate. The flat plate portion 104*a* is positioned away from these portions by about a half distance of the width of the electrode plate. The recesses 109 and the grooves 111 have bottoms positioned away from the flat plate portion 104*a* by about a half distance of the width of the electrode plate. Portions in gray in FIG. 4(*a*) represent the uppermost surfaces of the electrode plate 104 ( tops of the protrusions 110 and tops of the raised lines 112*a*, 112*b*).

Among those electrode plates 104, portions contacting and likely to contact adjacent electrode plates 104' are coated for electrical insulation. In this embodiment, the bottoms of the recesses 109, tops of the protrusions 110, the top of the outer raised line 112*a* and the bottom of the groove 111 for the sealing member are coated with Teflon (polytetrafluoroethylene).

As illustrated in FIGS. 2, 3 and 5, in the spaces S on the opposite sides of the electrode plate 104 are respectively disposed the porous electric current supplier 105 and a pair of spacers 106. The pair of the spacers 106 are disposed with the electric current supplier 105 therebetween as viewed in plane. Due to the presence of the inner raised line 112*b*, lower spacers 106*c*, 106*d* are sized to be larger than upper spacers 106*a*, 106*b*. Annular spacer 106*e* is fitted into a dead space defined on the rear side (lower side) of the inner raised line 112*b*.

At corresponding places of the spacers 106 and the electrode plates 104 are formed holes respectively forming fluid flowing passages 113, 114, 115, 116. Specifically, in FIGS. 2, 3 and 5, holes for forming the oxygen flowing passages 113 and the hydrogen flowing passages 114 are formed in spacers 106*a*, 106*c* on the left hand side of the electric current supplier 105, and the corresponding positions of the electrode plate 104, while holes for forming the demineralized water flowing passages 115, 116 are formed in the spacers 106*b*, 106*d* on the right hand side of the electric current supplier 105, and the corresponding positions of the electrode plate 104. In FIGS. 2, 3 and 5, the space S on the upper side of the electrode plate 104 acts as hydrogen generating chamber C, while the space S on the lower side acts as oxygen generating chamber A. Into the groove 111 is fitted the annular sealing member 107 for hermetically sealing the hydrogen generating chamber C and the oxygen generating chamber A from the outside.

In FIGS. 2, 3 and 5, on a lower side of the spacer 106*a* positioned on the upper and left hand side of the electrode plate 104 is formed O-ring groove 117 surrounding the oxygen flowing passage 113, and hydrogen groove 118 for connection between the hydrogen flowing passage 114 and the hydrogen generating chamber C. On an upper side of the spacer 106a is also formed another O-ring groove 117 surrounding the oxygen flowing passage 113.

On an upper surface of the spacer 106c positioned on the lower and left hand side of the electrode plate 104 are formed O-ring groove 117 surrounding the hydrogen flowing passage 114, and oxygen groove 119 for connection between the oxygen flowing passage 113 and the oxygen generating chamber A. On a lower surface of the spacer 106c is also formed another O-ring groove 117 surrounding the hydrogen flowing passage 114.

On upper and lower surfaces of the spacer 106b positioned on the upper and right hand side of the electrode plate 104 are formed O-ring grooves 117 surrounding the demineralized water flowing passages 115, 116.

On the upper surface of the spacer 106d positioned on the lower and left hand side of the electrode plate 104 is formed demineralized water groove 120 for connection between the demineralized water flowing passages 115, 116 and the oxygen generating chamber A.

O-rings 121 are respectively fitted into the O-ring grooves 117. These O-rings 121 effectively shut the respective fluid flowing passages off from the oxygen generating chamber, the hydrogen generating chamber and the outside.

The demineralized water groove 120 formed on the spacer 106d on the lower and left hand side of the electrode plate has a different shape from the hydrogen groove 118 and the oxygen groove 119 formed on the other spacers 106a, 106c. That is, on the contrary to the hydrogen groove 118 and the oxygen groove 119 each formed as an independent single groove, the demineralized water groove 120 is formed with recess 120a for connection between the demineralized water flowing passages 115, 116 and the oxygen generating chamber A, having a width enough to surround the two demineralized water flowing passages 115, 116, and small grooves 120b formed on a bottom surface of the recess 120a, extending from the flowing passages 115, 116 towards the oxygen generating chamber A. The demineralized water groove 120 having this arrangement enables uniformed feeding of demineralized water as electrolyzed water to the porous electric current suppliers 105. The O-ring 121 mounted on the spacer 106b closer to the hydrogen generating chamber prevents inflow of the demineralized water into the hydrogen generating chamber C.

On the other hand, oxygen gas generated in the oxygen generating chamber A is taken out from the oxygen flowing passage 113 through the oxygen groove 119. The O-ring 121 mounted on the spacer 106a disposed within the hydrogen generating chamber C prevents oxygen gas flowing in the oxygen flowing passage 113 from outflowing to the hydrogen generating chamber C.

Hydrogen gas generated in the hydrogen generating chamber C is taken out from the hydrogen flowing passage 114 through the hydrogen groove 118. Similarly, the O-ring 121 mounted on the spacer 106c disposed within the oxygen generating chamber A prevents hydrogen gas flowing in the hydrogen flowing passage 114 from outflowing to the oxygen generating chamber A.

The sealing member 107 prevents the generated oxygen gas and hydrogen gas from leaking to the outside via a connected portion of the electrode plate unit 103. This sealing member 107 is so arranged as to be pressed by a bottom of a groove 111' of another electrode plate 104' adjacent to one electrode plate 104, while being fitted into the groove 111 formed on the one electrode plate 104 (see FIGS. 2 and 3). That is, the bottom of the groove 111' of the other electrode plate 104' which abuts the sealing member 107 fitted into the groove 111 of the one electrode plate 104 is pressed and deformed upon receiving the fastening force of the fastening bolts for fastening several electrode plate units 103 together, in addition to increased pressure within the oxygen generating chamber A and the hydrogen generating chamber C due to the generated gases, so that the bottom of the groove 111' presses the sealing member 107 and deforms the same towards an inner wall of the groove 111 of the one electrode plate 104. Therefore, unlike a conventional electrochemical cell with gaskets stacked on plate-shaped electrode plates, the gaskets do not protrude to the outside due to excessive fastening force, thereby preventing creep of the gaskets due to large deformation. As a result, the sealing ability of the electrochemical cell can be improved.

In assembling the electrochemical cell 101 by interconnecting the electrode plate units 103 together, the porous electric current suppliers 105 and the spacers 106 are disposed within the spaces S, while the sealing member 107 and the O-rings 121 are respectively disposed in the grooves 111, 117. That is, the respective parts are placed in position as fitted in the corresponding recessed portions (spaces S, grooves 111, 117). Therefore, the electrode plate unit 103 according to this embodiment can be assembled in remarkably easy manner as compared with the conventional electrochemical cell.

As described above, the electrochemical cell 101 of this embodiment has the plurality of electrode plate units 103 interconnected together with the protrusions 110 and the recesses 109 of the one electrode plate 104 respectively facing the recesses 109' and the protrusions 110' of the other electrode plate 104' positioned above the one electrode plate 104 and adjacent to the same. That is, the electrochemical cell 101 has a honeycomb-like side portion formed by the protrusions 110 and the recesses 109 of the electrode plate 104 (FIG. 1(b)). Therefore, the electrochemical cell 101 can obtain a strength enough to withstand against a high pressure within the cell caused by a generated gas, while using the electrode plates 104, which are formed from such a thinner metal plate as to be capable of being press-formed. In addition, the electrode plates 104 forming the honeycomb-like side portion each have such a thickness as to be capable of being press-formed, and also possess a proper elasticity through the peripheral edge portion 108 with the alternately arrayed recesses 109 and protrusions 110. Therefore, it is possible to effectively compensate increase in contacting surface pressure between the adjacent electrode plate units due to assembling errors in assembling, thermal expansion of the gaskets during the operation, or the like. As a result, the electrochemical cell 101 can be used for a so-called high-pressure type hydrogen/oxygen generating device (operating pressure: e.g., about 10 atm.) without using a known electrolysis tank.

As the solid electrolyte membrane 2, a so-called solid polymer electrolyte membrane formed from an ionic conductive polymer membrane having opposite side surfaces on which porous catalytic electrodes made of metals of the platinum group or the like formed by electroless plating, hot pressing or the like is sometimes used. Since this solid polymer electrolyte membrane is relatively soft, it is likely to be damaged if the pressure increases on its surfaces contacting the porous electric feeding membranes 105. However, the electrochemical cell 101 of the present invention with the electrode plates 104 having such an elasticity as to compensate the increase in contacting surface pressure due to the thermal expansion can effectively prevent damages on the solid polymer electrolyte membrane, and hence maintain a stabilized water electrolysis for a long period of time.

Embodiment 2

Now, the electrochemical cell of one embodiment according to the second aspect of the present invention will be described with reference to the drawings.

Figure 8:
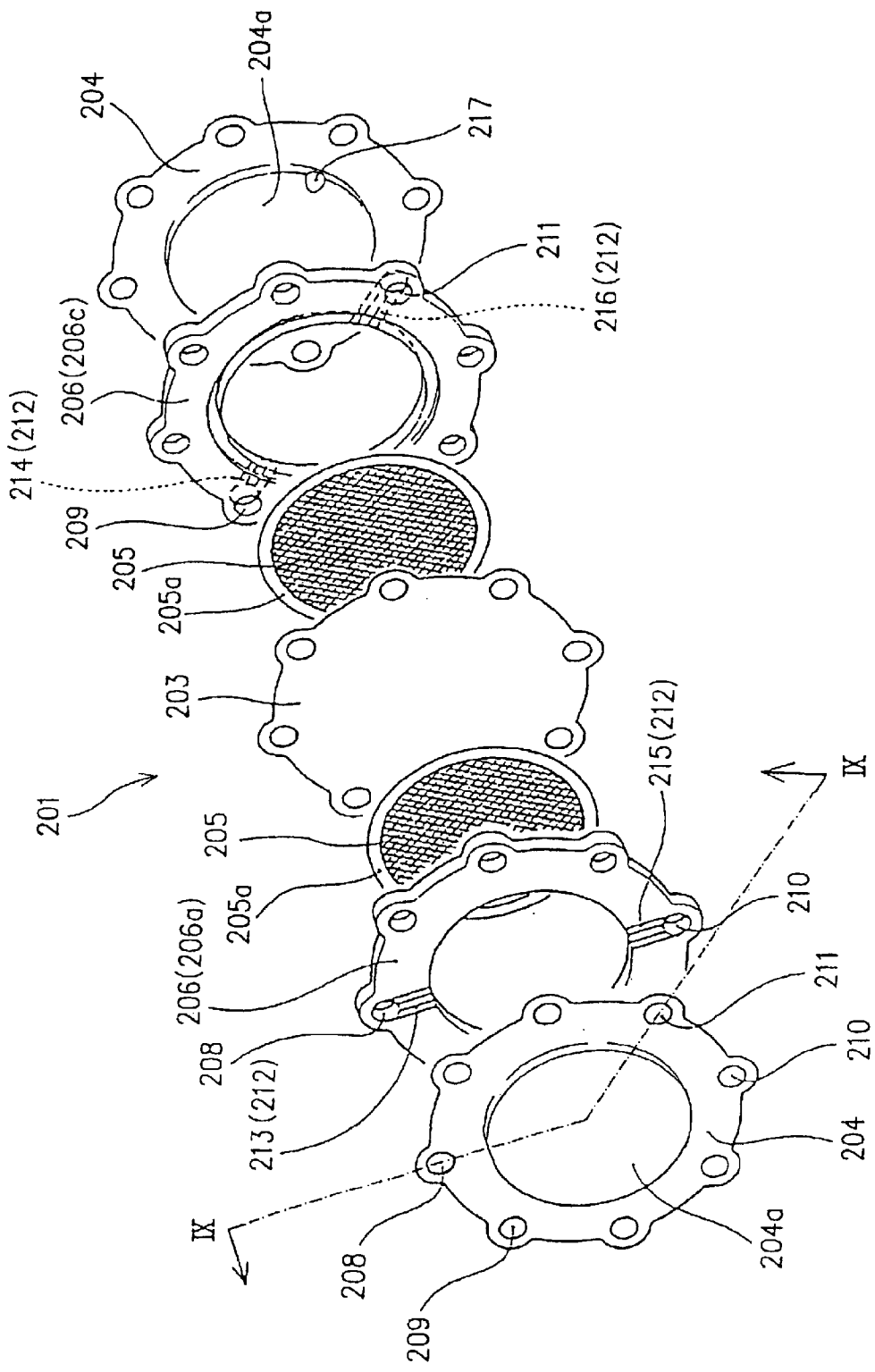
FIG. 8 is a perspective view illustrating an essential portion of one embodiment of the electrochemical cell according to a second aspect of the present invention.
Figure 9:
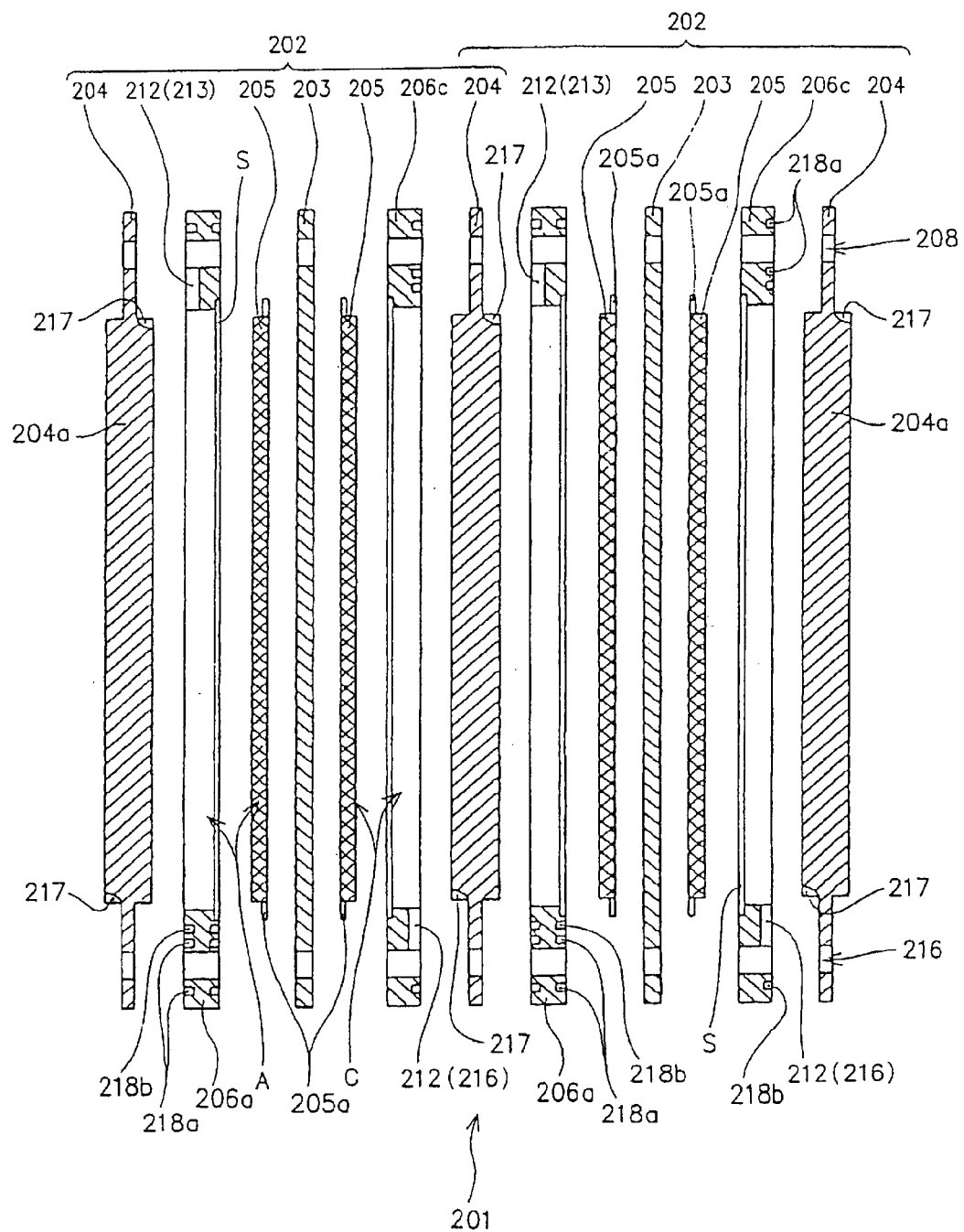
FIG. 9 is a cross section taken along line IX—IX in FIG. 8, illustrating the electrochemical cell of FIG. 8 prior to the assembling thereof.
Figure 10:
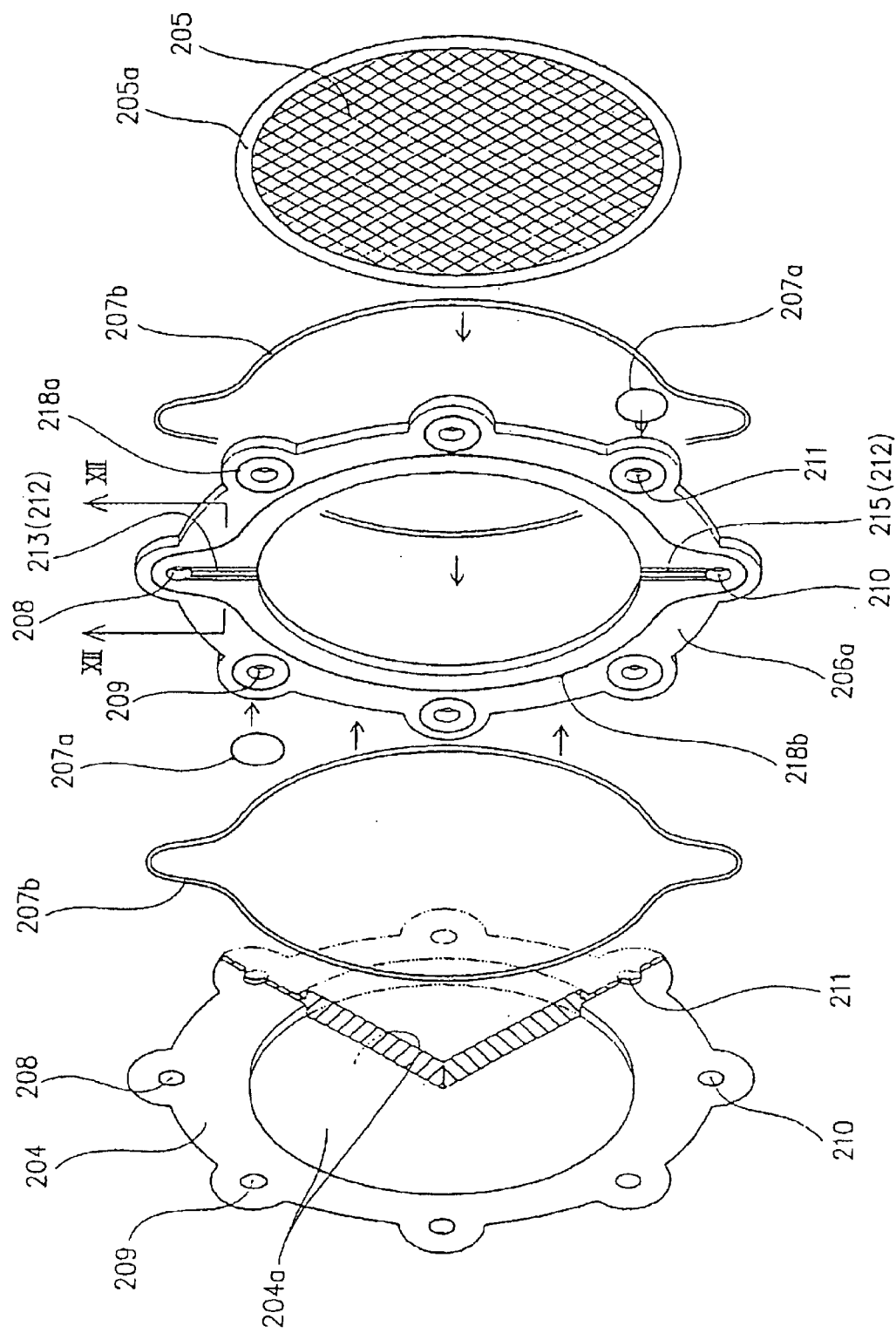
FIG. 10 is a perspective view illustrating an electrode plate, a porous electric current supplier and one annular member in the electrochemical cell of FIG. 8.
Figure 11:
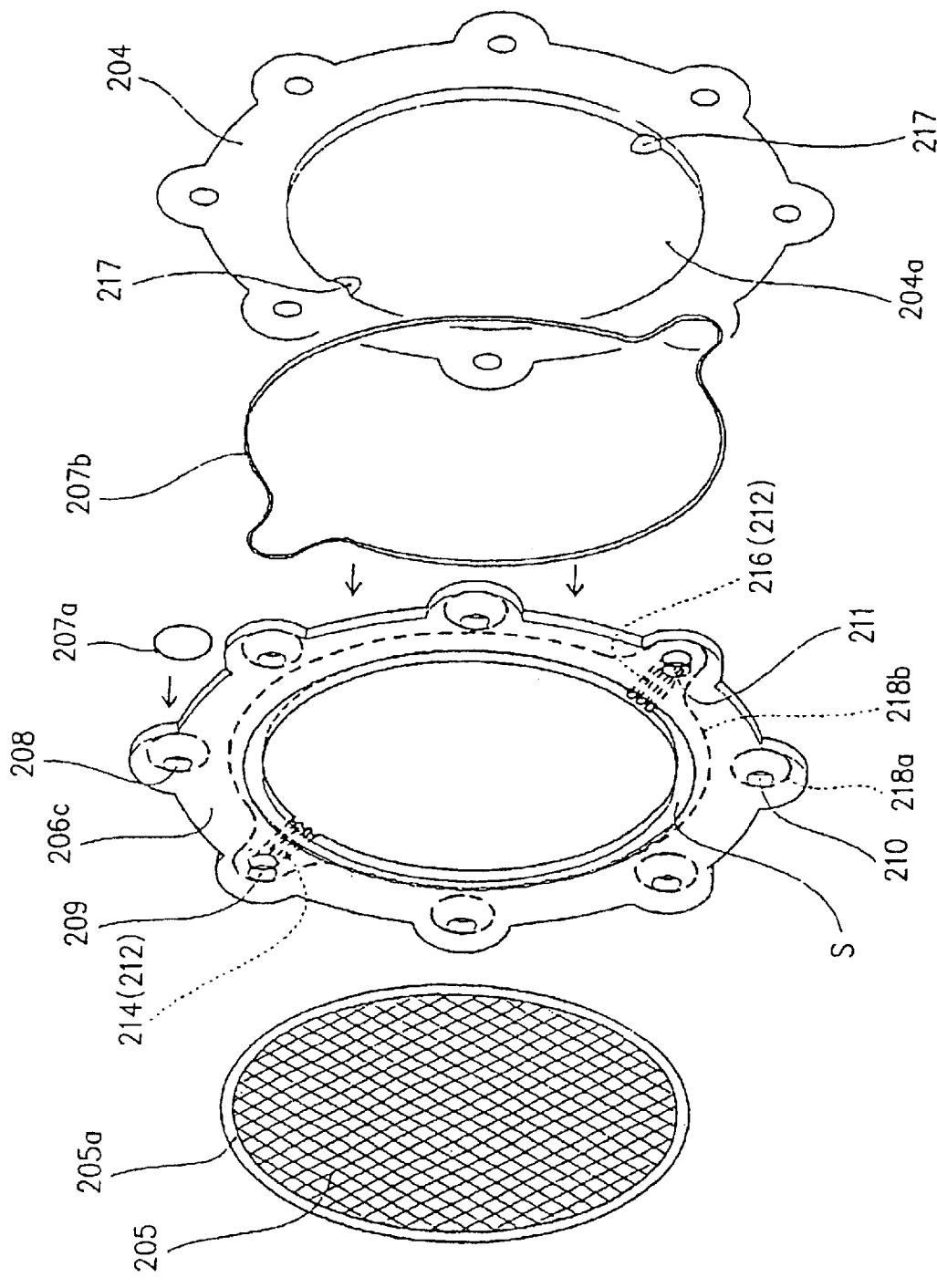
FIG. 11 is a perspective view illustrating an electrode plate, a porous electric current supplier and another annular member in the electrochemical cell of FIG. 8.
Figure 12:
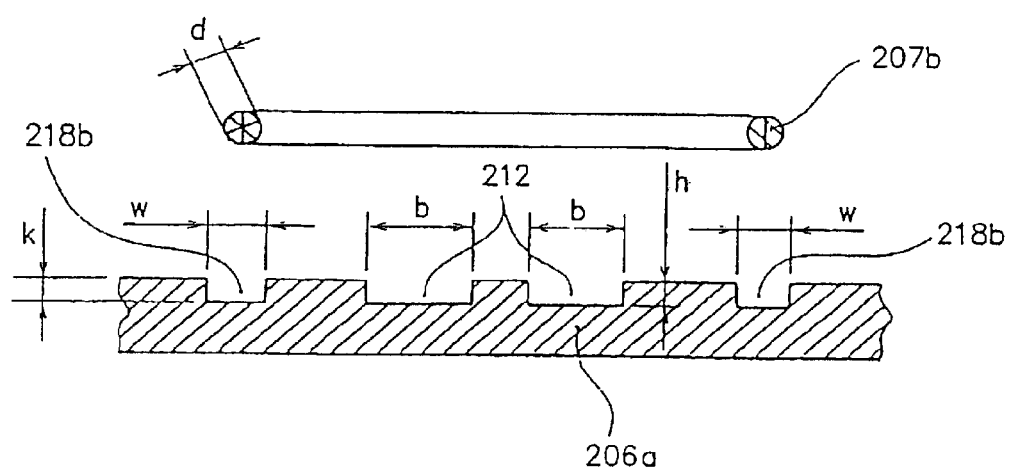
FIG. 12 is a cross section taken along line XII—XII in FIG. 10.
Figure 13:
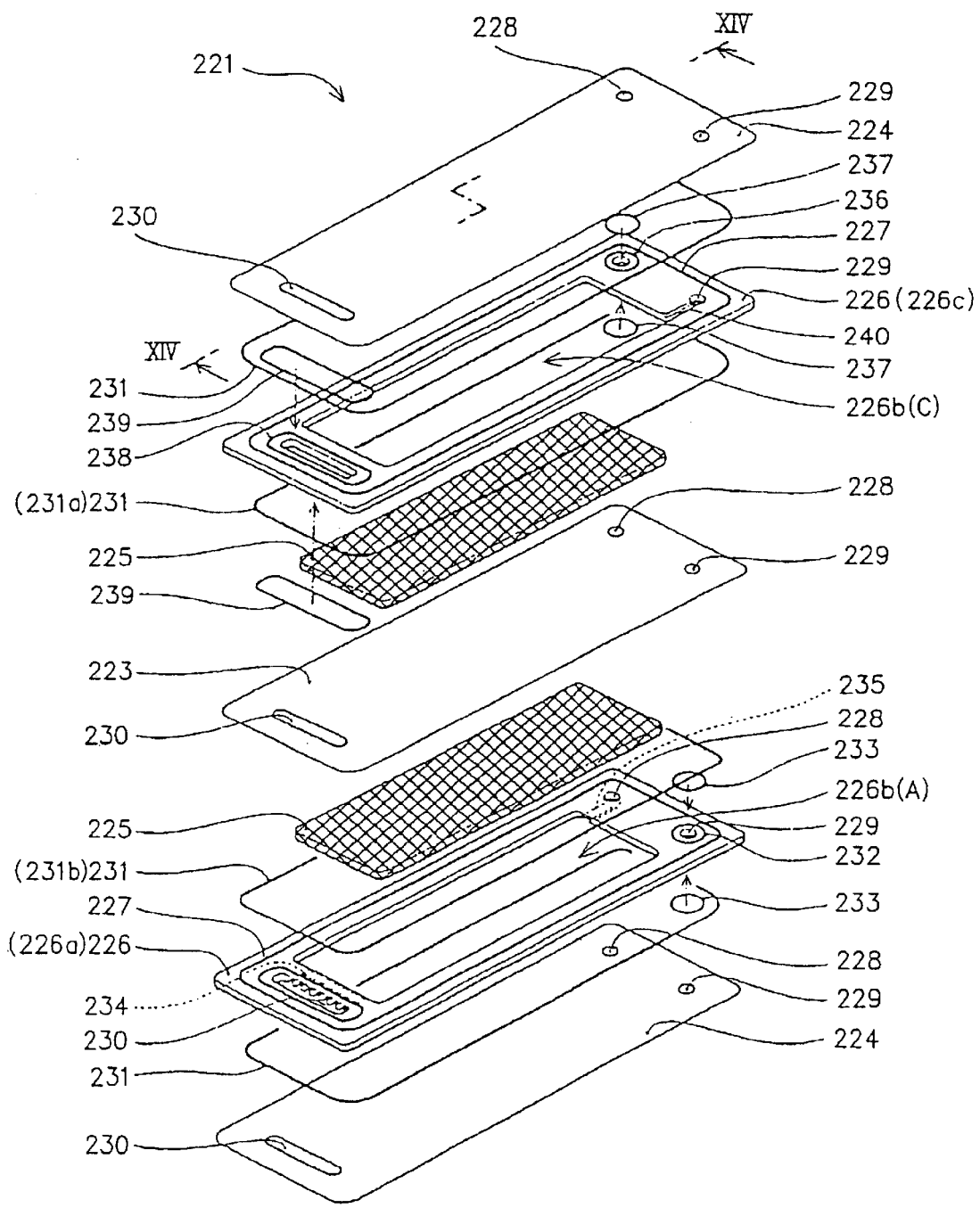
FIG. 13 is a perspective view illustrating an essential portion of another embodiment of the electrochemical cell prior to the assembling thereof according to the second aspect of the present invention.
Figure 14:
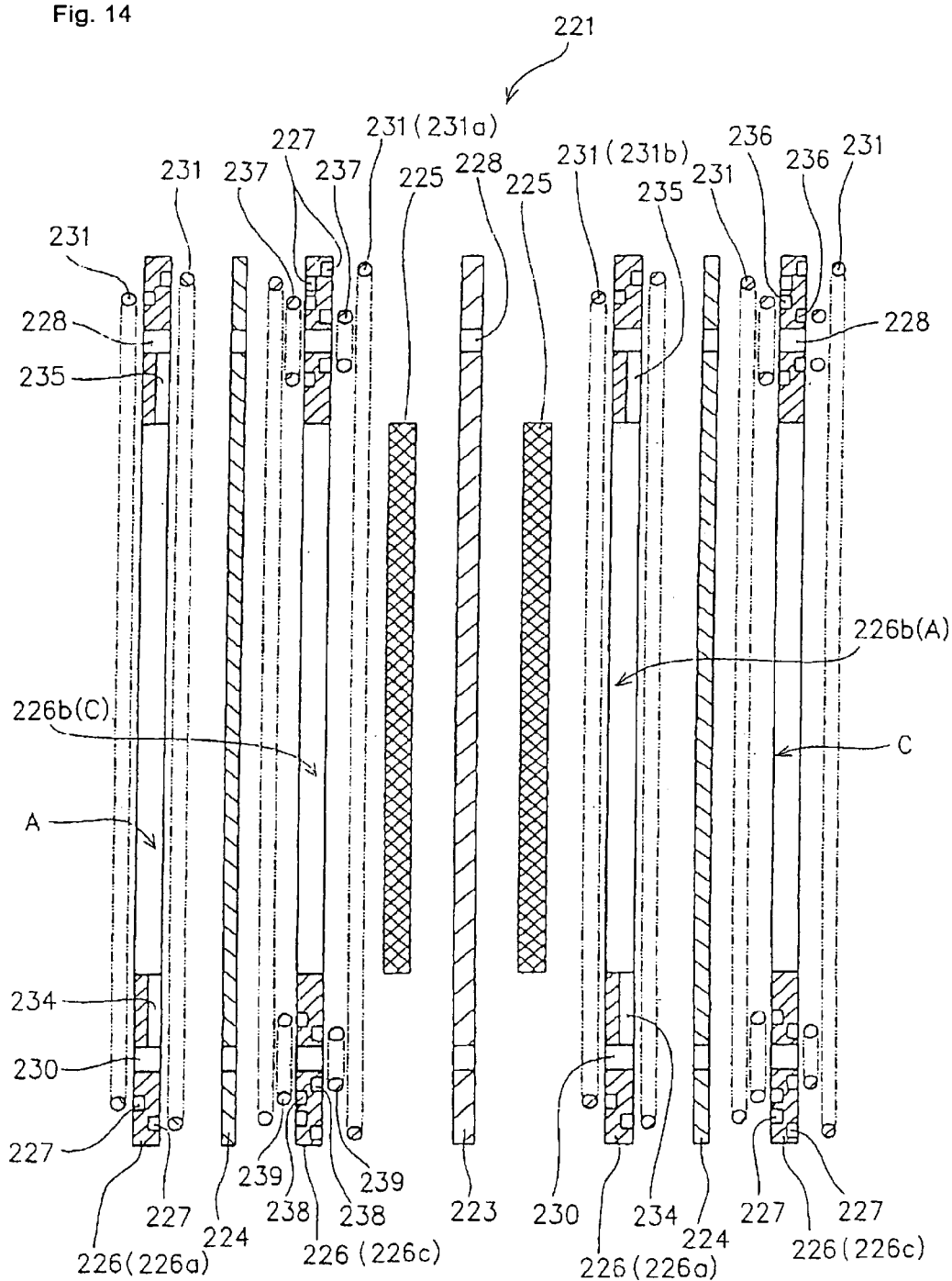
FIG. 14 is a cross section taken along line XIV—XIV in FIG. 13, illustrating an essential portion of the electrochemical cell of FIG. 13 prior to the assembling thereof.
Figure 15:
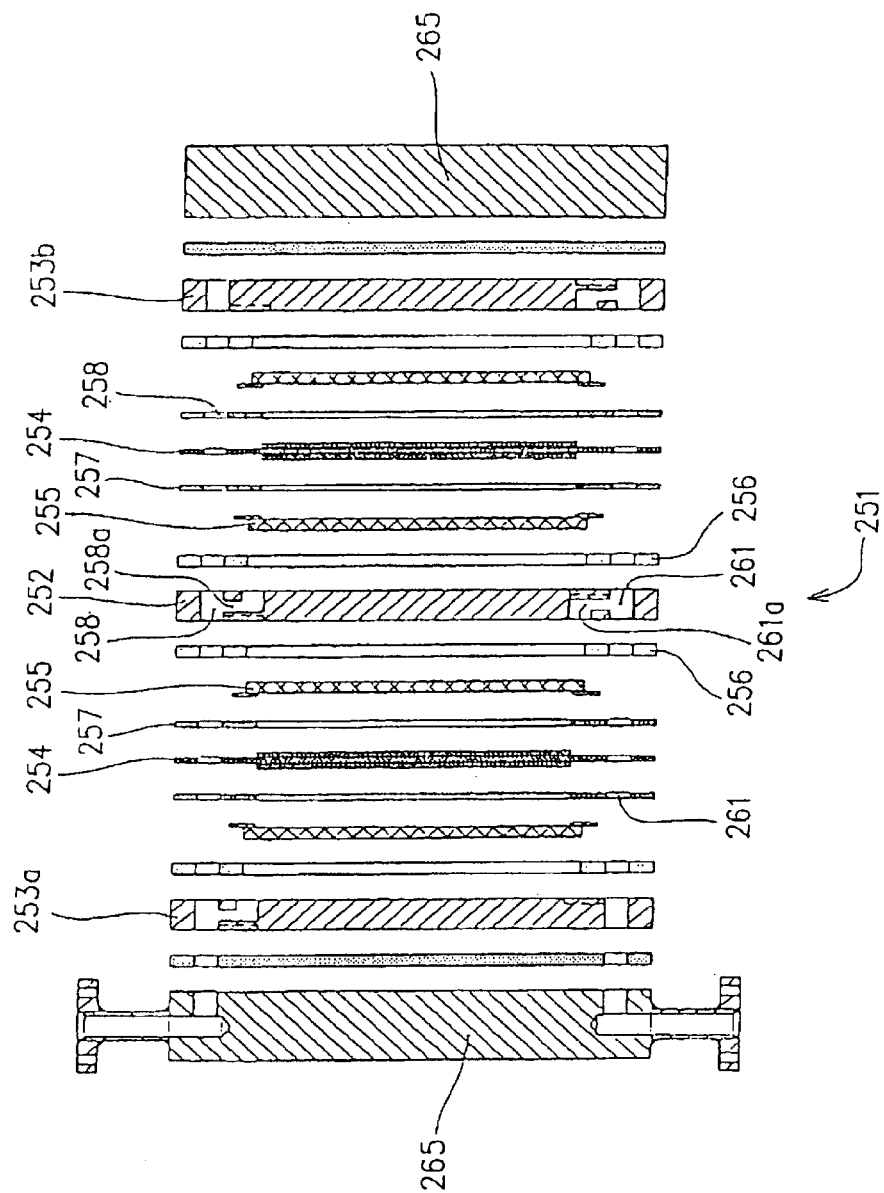
FIG. 15 is a cross section illustrating one embodiment of the conventional electrochemical cell prior to the assembling thereof.
Figure 16:
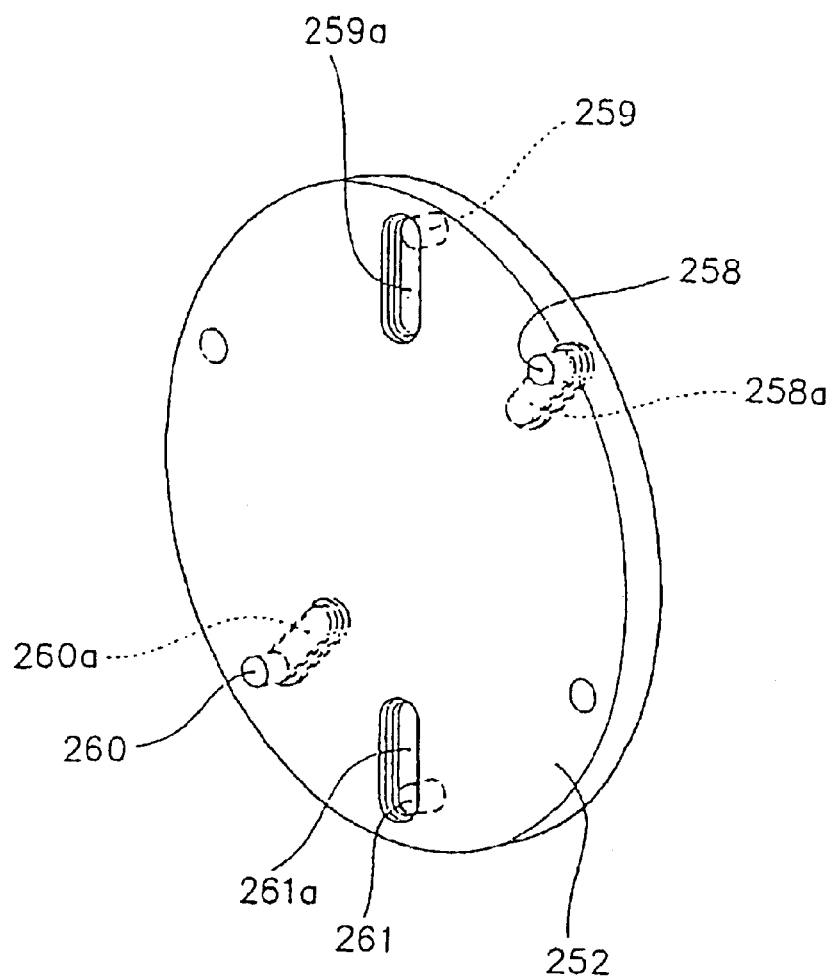
FIG. 16 is a perspective view illustrating one embodiment of a bipolar electrode plate at the intermediate point of the conventional electrochemical cell.

FIG. 8 is a perspective view illustrating an essential portion of electrochemical cell 201 of this embodiment prior to the assembling thereof. FIG. 9 is a cross section taken along line IX—IX in FIG. 8, illustrating the essential portion of the electrochemical cell 201 of FIG. 8 prior to the assembling thereof. FIG. 10 is a perspective view illustrating an electrode plate, a porous electric current supplier and one annular member in the electrochemical cell of FIG. 8. FIG. 11 is a perspective view illustrating an electrode plate, a porous electric current supplier and another annular member in the electrochemical cell of FIG. 8. FIG. 12 is a cross section taken along line XII—XII in FIG. 10. FIG. 13 is a perspective view illustrating an essential portion of another embodiment of the electrochemical cell prior to the assembling thereof according to the second aspect of the present invention. FIG. 14 is a cross section taken along line XIV—XIV in FIG. 13, illustrating an essential portion of the electrochemical cell of FIG. 13 prior to the assembling thereof.

As illustrated in FIG. 9, the electrochemical cell 201 of this embodiment is formed by lining up a predetermined set of solid electrolyte membrane units 202. Each solid electrolyte membrane unit 202 includes solid electrolyte membrane 203, electrode plates 204 disposed on the opposite sides of the solid electrolyte membrane 203, porous electric current suppliers 205 disposed within accommodation spaces formed between the solid electrolyte membrane 203 and the electrode plates 204. One of the accommodation spaces acts as anode chamber A, while the other acting as cathode chamber C.

The electrochemical cell 201 has a plurality of the solid electrolyte membrane units 202 interconnected to each other in tandem. Specifically, as illustrated in FIG. 9, one unit 202 is interconnected to an adjacent unit 202 via a proper fastening means such as bolts with an electrode plate in a connecting portion jointly held by these units. The outermost electrode plates of the interconnected units act as monopolar electrode plates. With this arrangement, demineralized water fed is electrolyzed by applying an electrolysis voltage between the monopolar electrode plates, thereby generating oxygen gas in the anode chamber A and hydrogen gas in the cathode chamber C.

The units 202 each are also provided with annular member 206 defining the anode chamber A and the cathode chamber C in cooperation with the membrane 203 and the electrode plate 204. This annular member 206 is disposed surrounding the porous electric current supplier 205, so that it acts as a seal ring member to isolate the anode chamber A and the cathode chamber C from the outside. Specifically, seal rings 207a, 207b are provided on a peripheral edge portion of a side surface of the annular member 206 (see FIGS. 10 and 11). The seal ring member thus seals the porous electric current supplier 205 from the outside. The illustration of the seal rings is omitted in FIGS. 8 and 9.

The electrode plates 204 each have a peripheral edge portion and center protrusion 204a projected along radially inward ends of the opposite side surfaces of the peripheral edge portion towards the opposite sides of the cell stacking direction. In this embodiment, the electrode plates 204 each have a substantially circular shape in plane, while the center protrusion 204a is formed into a circular shape coaxial with the electrode plates. The center protrusion 204a is fitted into a center hole of a corresponding annular member 206 (see FIG. 9, or other Figure), thereby achieving improved assembling efficiency of the electrochemical cell. More specifically, in this embodiment, the electrode plates 204 each are shaped to have a plate thickness of about 1 mm in the peripheral edge portion and about 5 mm in the center protrusion 204a by using a titanium plate having a plate thickness of about 5 mm. That is, the electrode plates 204 each have opposite side surfaces on which opposite sides of the center protrusion 204a each having a height of about 2 mm from the peripheral edge portion are formed. The porous electric current suppliers 205 each have a thickness of about 1 mm, and the annular members 206 each have a thickness of about 3 mm.

As illustrated in FIG. 8, excepting the porous electric current supplier 205 having a diameter smaller than other parts, the membrane 203, the electrode plates 204 and the annular members 206 have peripheral edge portions each forming therein holes with a substantially equal spacing along the peripheral direction, which holes respectively forming oxygen gas take-out conduit 208, hydrogen gas take-out conduit 209, demineralized water feeding conduit 210 and water drainage conduit 211 for the cathode chamber.

The annular members 206 and the electrode plates 204 each form therein passages for connection between the respective conduits 208, 209, 210, 211 and the anode chamber A or the cathode chamber C, as illustrated in FIGS. 8–11.

That is, annular member 206a for the anode chamber A has a side surface facing the electrode plate 204 (see FIG. 10) that forms therein two grooves 212 for connections of the oxygen gas take-out conduit 208 and the demineralized water feeding conduit 210 to the anode chamber A. These grooves 212 respectively constitute oxygen gas take-out passage 213 and demineralized water distributing passage 215.

On the other hand, annular member 206c for the cathode chamber C has a side surface facing the electrode plate 204 (see FIG. 11) that forms therein two grooves 212 for connections of the hydrogen gas take-out conduit 209 and the water drainage conduit 211 for the cathode chamber to the cathode chamber C. These grooves 212 respectively constitute hydrogen gas take-out passage 214 and water drainage passage 216.

Although the grooves 212 have a cross section with width b (FIG. 12) of about 6 mm and depth h (FIG. 12) of about 1 mm in this embodiment, these sizes are only illustrative examples.

Preferably, cut-away portions 217 are formed at corresponding positions of the peripheral edge portion of the center protrusion 204a of each electrode plate 204 for securing communicated relationships between the respective grooves 212 and the anode chamber A or the cathode chamber C (see FIG. 9 and other Figures).

The annular members 206 each form a space (center hole) on the inner diameter side, into which the center protrusion 204a of the electrode plate 204 is fitted from one side, and the porous electric current supplier 205 is engagingly fitted from the opposite side.

The porous electric current suppliers 205 each include a porous body made of a titanium mesh or the like, and reinforcing ring 205a extending radially outwardly from the body.

Since both the body and the reinforcing ring abut the membrane 203, the following treatment for imparting acid resisting property is conducted. That is, a membrane-abutting surface of the body is subjected to precious metal plating such as platinum plating, while a membrane-abutting surface of the reinforcing ring is coated with an acid resistant resin such as PFA or PTFE (polytetrafluoroethylene). Therefore, it is not necessary to use a conventionally needed PFA protection sheet which is thin and therefore poses inconvenience in handling.

As illustrated in FIGS. 9 and 11, on a side surface of the annular member 206 through which the porous electric current supplier 205 is fitted with the annular member 206 is formed stepped portion S, into which the reinforcing ring 205a is fitted. The stepped portion S has substantially the same depth as the thickness of the reinforcing ring 205a to be fitted. In this embodiment, both the reinforcing ring 205a and the stepped portion S have a thickness (depth) of about 0.1 mm.

In the thus arranged electrochemical cell 201, demineralized water fed from the demineralized water feeding conduit 210 to the anode chamber A via the demineralized water distributing passage 215 is disassociated into oxygen gas and protons within the anode chamber (specifically, within a catalytic layer provided on a side surface of the membrane 202 closer to the anode chamber). The oxygen gas generated is taken out through the oxygen gas take-out passage 213 and the oxygen gas take-out conduit 208 along with the residual demineralized water.

On the other hand, the protons intrude into the cathode chamber, permeating through the membrane 202, and turn into hydrogen gas upon receiving electrons within the cathode chamber (specifically, within a catalytic layer provided on a side surface of the membrane 202 closer to the cathode chamber). The generated hydrogen gas is taken out from the hydrogen gas take-out passage 214 through the hydrogen gas take-out conduit 209.

As illustrated in FIGS. 9–11, the opposite sides of each annular member 206 have peripheral edge portions that form therein two types of grooves 218a, 218b. The groove 218a is formed surrounding the respective fluid conduits 208, 209, 210, 211. Seal ring 207a having a small circular shape is mounted in the groove 218a to seal the respective fluid conduits 208, 209, 210, 211.

On the other hand, the groove 218b is formed as passing on the radially outer side of the fluid conduits in connection with the fluid passages 213, 214, 215, 216, among the fluid conduits 208, 209, 210, 211, and on the radially inner side of the fluid conduits out of connection with the fluid passages 213, 214, 215, 216, among the fluid conduits 208, 209, 210, 211. Seal ring 207b having a larger diameter is mounted in the groove 218b to seal the anode chamber A and the cathode chamber C.

Preferably, the annular member 206a defining the anode chamber A has the seal ring grooves 218a, 218b formed at different positions (the seal rings 207a and 207b disposed at different positions) from those of the annular member 206c defining the cathode chamber C.

That is, as illustrated in FIGS. 9 and 10, the annular member 206a defining the anode chamber A forms at corresponding positions of the opposite side surfaces the grooves 218a, 218b having the same shape, and the seal rings 207a, 207b are respectively disposed in the same grooves on these opposite side surfaces.

On the contrary to this, as illustrated in FIGS. 9 and 11, the annular member 206c defining the cathode chamber C forms the seal ring grooves 218a, 218b only on one side surface thereof, and therefore the seal rings 207a, 207b are mounted on only the grooves 218a, 218b of this one side surface.

The forming positions of the grooves 207a, 207b of the annular member 206a are different from those of the annular member 206c for the following reason. That is, where a soft solid electrolyte membrane 203 is used and the seal rings 207a, 207b are disposed on the opposite sides of the solid electrolyte membrane 203, the seal rings 207a, 207b resultingly clamp the soft solid electrolyte membrane 203 from the opposite sides. This may invite damages on the membrane 203. Also, where soft seal rings 207a, 207b are disposed facing to each other with the soft solid electrolyte membrane 203 therebetween, a sufficient reaction force against the seal rings 207a, 207b cannot be expected when assembling the electrochemical cell, so that a sufficient sealing effect may not be produced.

In order to avoid these disadvantages, in this embodiment, the solid electrolyte membrane 203 each are so arranged as to be clamped by the seal rings 207a, 207b and a flat surface of the annular member 206. If the solid electrolyte membrane is made of a hard material such as ceramics, the seal rings 207a, 207b can be disposed on the opposite sides of the membrane.

Thus, the respective fluid conduits 208, 209, 210, 211 in connection with the fluid passages 213, 214, 215, 216 maintain a communicating relationship with a corresponding anode chamber A (or cathode chamber C), while being well sealed from the outside. The respective fluid conduits out of connection with the fluid passages are sealed from the peripheries.

In this embodiment, as described above, the seal rings 207b having a larger diameter each are designed to pass on the inner side of the fluid conduits 208, 209, 210, 211 out of connection with the fluid passages 213, 214, 215, 216. Alternatively, it is a matter of course that the seal ring 207b of a larger diameter passes on the radially outer side of all the fluid conduits 208, 209, 210, 211.

For example, the seal ring grooves 218a, 218b have width w (see FIG. 12) of about 2.1 mm, depth k of about 1 mm, while the seal rings 207a, 207b have a cross sectional diameter of about 1.5 mm.

In this embodiment, the annular members 206a each have opposite side surfaces on which the seal ring grooves 218a, 218b are formed, while the annular members 206c each have the only one side surface on which the seal ring grooves 218a, 218b are formed. However, it is a matter of course that the relationship between them can be reversed.

Further, the annular members 206 are made of a non-conductive material having acid resisting property, and preferably a predetermined strength. As such a material, for example, fiber reinforced plastic, fluoroplastic and ceramics are properly used.

The seal rings 207a, 207b possess a predetermined elasticity, and preferably they have acid resisting property. As such a material, for example, acid resistant rubber such as fluorine rubber and perfluoroelastomer, and a double structured rubber with an acid resistant layer formed thereon are properly used.

Further, in the illustrated embodiment, although the membrane 203, the electrode plates 204 and the annular members 206 form therein holes that do not constitute the oxygen gas take-out conduit 208, the hydrogen gas take-out conduit 209, the demineralized water feeding conduit 210 and the water drainage conduit 211 for the cathode chamber, these holes may be used as fluid conduits according to needs, or may be omitted if they are not needed.

In FIGS. 13 and 17, electrochemical cell 221 according to another embodiment of the second aspect of the present invention is illustrated. This electrochemical cell 221 has a rectangular shape in plane. That is, all of solid electrolyte membrane 223, electrode plates 224 on the opposite sides of the membrane 223, porous electric current suppliers 225 and annular members 226 have a rectangular shape in plane. The positional relationship between these constituent parts 223, 224, 225, 226 are the same as that of the aforesaid electrochemical cell 201 (see FIGS. 8-11 and other Figures).

While, in the electrochemical cell 201 as illustrated in FIGS. 8-11, the reinforcing rings 205a are provided on the porous electric current suppliers 205, and the annular members 206 form thereon the stepped portions S into which the reinforcing rings 205a are fitted, the electrochemical cell 221 of this embodiment is not provided with both the reinforcing rings and the stepped portions S.

That is, in the electrochemical cell 221 of this embodiment, the annular members 226 each form window 226b of a rectangular outer shape which is substantially identical with the porous electric current supplier 225, enabling the porous electric current supplier 225 to be mounted in this window 226b. That is, the window 226b which is positioned between the membrane 223 and the electrode plate 224 constitutes the anode chamber A or the cathode chamber C.

The porous electric current suppliers 225 are formed as being slightly thicker than the annular members 226. Whereby, the porous electric current suppliers 225 can securely contact the solid electrolyte membrane 223 and the electrode plates 224 in assembling the electrochemical cell 221 without the necessity to form the electrode plates 224 to have the center protrusions 204a as the electrode plates 204 as illustrated in FIGS. 8-11. The secured contacts between these electric current suppliers 225, the membrane 223 and the electrode plates 224 prevents increase of the electric resistance and effectively prevents deterioration of the electrolysis efficiency.

It is a matter of course to form the porous electric current suppliers 225 as being thinner than the annular members 226 in the same manner as the electrochemical cell of FIGS. 8-11. In such a case, the porous electric current suppliers must be provided with reinforcing rings, while the annular members must form stepped portions around the windows 226b for the reinforcing rings. Also, the electrode plates each must form a center protrusion, that is, the center protrusion having substantially the same outer shape as the rectangular windows in the same manner as the electrode plates 204 of FIGS. 8-11.

The annular members 226 each form an opening having a rectangular shape in plane on its one peripheral side along the lengthwise direction. The solid electrolyte membrane 223 and the electrode plates 224 also form similar openings at corresponding positions. The openings of the annular members 226, the solid electrolyte membrane 223 and the electrode plates 224 form demineralized water feeding conduit 230. Preferably, the demineralized water feeding conduit 230 has a width approximate to the width of the windows 226b of the annular members.

On the other hand, the annular members 226 each form openings spaced apart from each other on the opposite peripheral side along the lengthwise direction. The solid electrolyte membrane 223 and the electrode plates 224 also form similar openings spaced apart from each other at corresponding positions. The openings of the annular members 226, the solid electrolyte membrane 223 and the electrode plates 224 respectively form oxygen gas take-out conduit 228 and hydrogen gas take-out conduit 229.

In the electrochemical cell 221 having the above arrangement, the following effects are produced. That is, as illustrated in FIG. 13, the window 226b of each annular member 226 defining the anode chamber A is of a rectangular shape, and demineralized water distributing passage 234 and oxygen gas take-out passage 235 are respectively formed on the outer sides of the window 226b, respectively closer to the one side and the opposite side along the lengthwise direction. Accordingly, the demineralized water fed from the demineralized water distributing passage 234 into the anode chamber A flows along the lengthwise direction of the window 226b from the one side towards the opposite side thereof. As a result, a uniform cross sectional area is achieved across a demineralized water passage in the anode chamber A.

More specifically, the cross sectional area of the anode chamber A between its demineralized water feeding side and its generated oxygen take-out conduit side is substantially uniform along the lengthwise direction of the window 226. Accordingly, the flow rate of the demineralized water is substantially uniform at an arbitrary position along the lengthwise direction of the anode chamber A. As a result, the water electrolysis in a contacting portion between the electric current suppliers 225 and the membrane 223 are substantially equally carried out throughout the whole region of the anode chamber along the lengthwise direction, so that hydrogen gas and oxygen gas can be produced with an improved efficiency.

As illustrated in FIGS. 13 and 14, the annular members 226a, 226c each have opposite side surfaces forming thereon rectangular sealing grooves 227 that surround all of the openings respectively forming the windows 226b, the demineralized water feeding conduit 230, the oxygen gas take-out conduit 228 and the hydrogen gas take-out conduit 229. Seal ring 231 having a rectangular shape (hereinafter referred to a rectangular seal ring) is fitted into the groove 227.

Annular member 226a forming therein the window 226b defining the anode chamber A (annular member for anode chamber) has opposite side surfaces forming thereon seal ring grooves 232 surrounding the opening constituting the hydrogen gas take-out conduit 229, and seal ring 233 is mounted in the groove 232. The annular member 226a for anode chamber has one side surface forming thereon the demineralized water distributing passage 234 for connection between the opening constituting the demineralized water feeding conduit 230 and the window 226b. The demineralized water distributing passage 234 may be formed by several grooves, enabling the feeding of demineralized water from the opening constituting the demineralized water feeding conduit 230 into the window 226b to be equally conducted across the width direction of the window 226b. The annular member 226a for anode chamber also forms on the one side surface the oxygen gas take-out passage 235 for connection between the window 226b and the opening constituting the oxygen gas take-out conduit 228.

On the other hand, annular member 226c forming therein the window 226b defining the cathode chamber C (annular member for cathode chamber) has opposite side surfaces respectively forming seal ring groove 236 and seal ring groove 238 respectively surrounding the openings constituting the oxygen gas take-out conduit 228 and the demineralized water feeding conduit 230. Seal ring 237 and seal ring 239 are mounted in these grooves 236 and 238. The annular member 226c for cathode chamber has one side surface forming thereon hydrogen gas take-out passage 240 for connection between the inside of the window 226b and the opening constituting the hydrogen gas take-out conduit 229.

As a result of the above arrangement, both the demineralized water feeding conduit 230 and the oxygen gas take-out conduit 228 are properly sealed with respect to the outside and the cathode chamber C. In addition, the hydrogen gas take-out conduit 229 are properly sealed with respect to the outside and the anode chamber A, while the anode chamber A and the cathode chamber C are properly sealed with respect to the outside.

In this embodiment, the rectangular seal ring 231 is so arranged as to pass on the outer side of all the fluid conduits 228, 229, 230. However, it is a matter of course that the rectangular seal ring 231 can pass on the inner side of the fluid conduits 228, 229, 230 out of connection with the fluid passages 234, 235, 240.

In FIG. 14, the respective seal rings 231, 233, 237, 239 are illustrated in chain double-dashed line for easy understanding.

As illustrated in FIG. 14, the opposite rectangular seal rings 231 (represented by reference codes 231a, 231b) disposed with the solid electrolyte membrane 223 therebetween are so arranged as not to face each other. This is because it is not suitable for the solid electrolyte membrane 223 to be clamped by the opposite soft rectangular seal rings 231a, 231b. The annular members 226 each have seal ring grooves formed on the opposite side surfaces, which grooves being offset from each other so as not to face each other. This is so as not to form the annular member 226 with a thickness larger than needed.

As the solid electrolyte membrane 223, it is preferable to use a solid polymer electrolyte membrane prepared by forming solid polymer electrolyte into a membrane form and forming a porous layer formed from a metal of the platinum group on the opposite side surfaces of this membrane by hot pressing or chemically electroless plating. As the solid polymer electrolyte, it is preferable to use a cation exchange membrane (fluorocarbon-type sulfonic acid, cation ion-exchange membrane, such as Nafion 117 from DuPont).

The electrochemical cell may be placed in vertical or horizontal orientation. The electrode plate of the present invention can be applied not only to a high-pressure type hydrogen/oxygen generating device with the electrochemical cell disposed within an electrolysis tank, but also to a low-pressure type hydrogen/oxygen generating device equipped with no electrolysis tank.

Embodiment 3

Now, the electrochemical cell of one embodiment according to the third and fourth aspects of the present invention will be described with reference to the drawings.

Figure 18A:
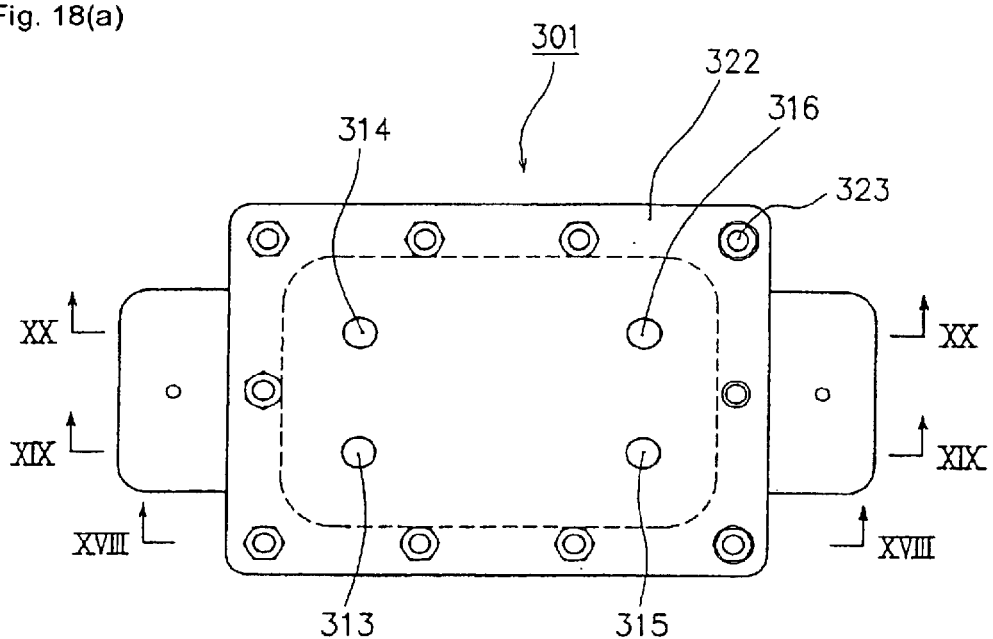
FIG. 18(a) is a schematic view of one embodiment of the electrochemical cell according to third and fourth aspects of the present invention.
Figure 18B:
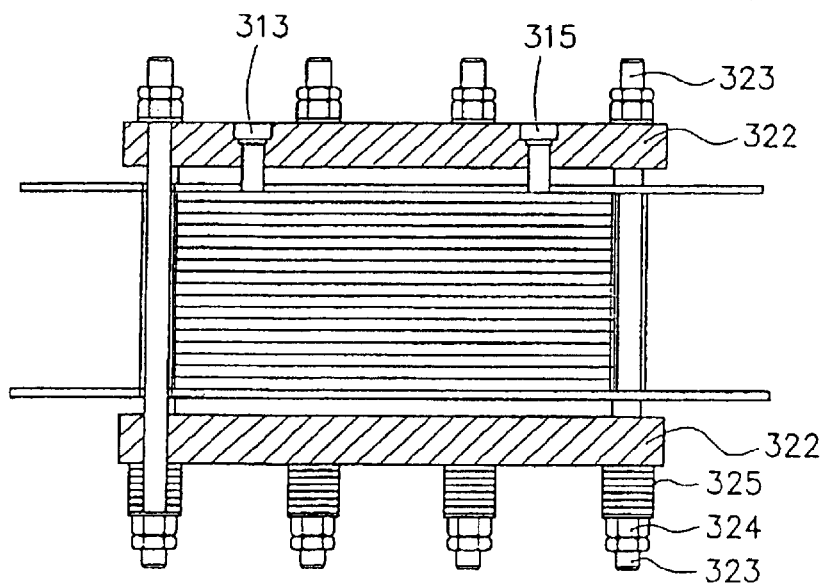
FIG. 18(b) is a partial cross section taken along line XVIII—XVIII in FIG. 18(a).
Figure 19:
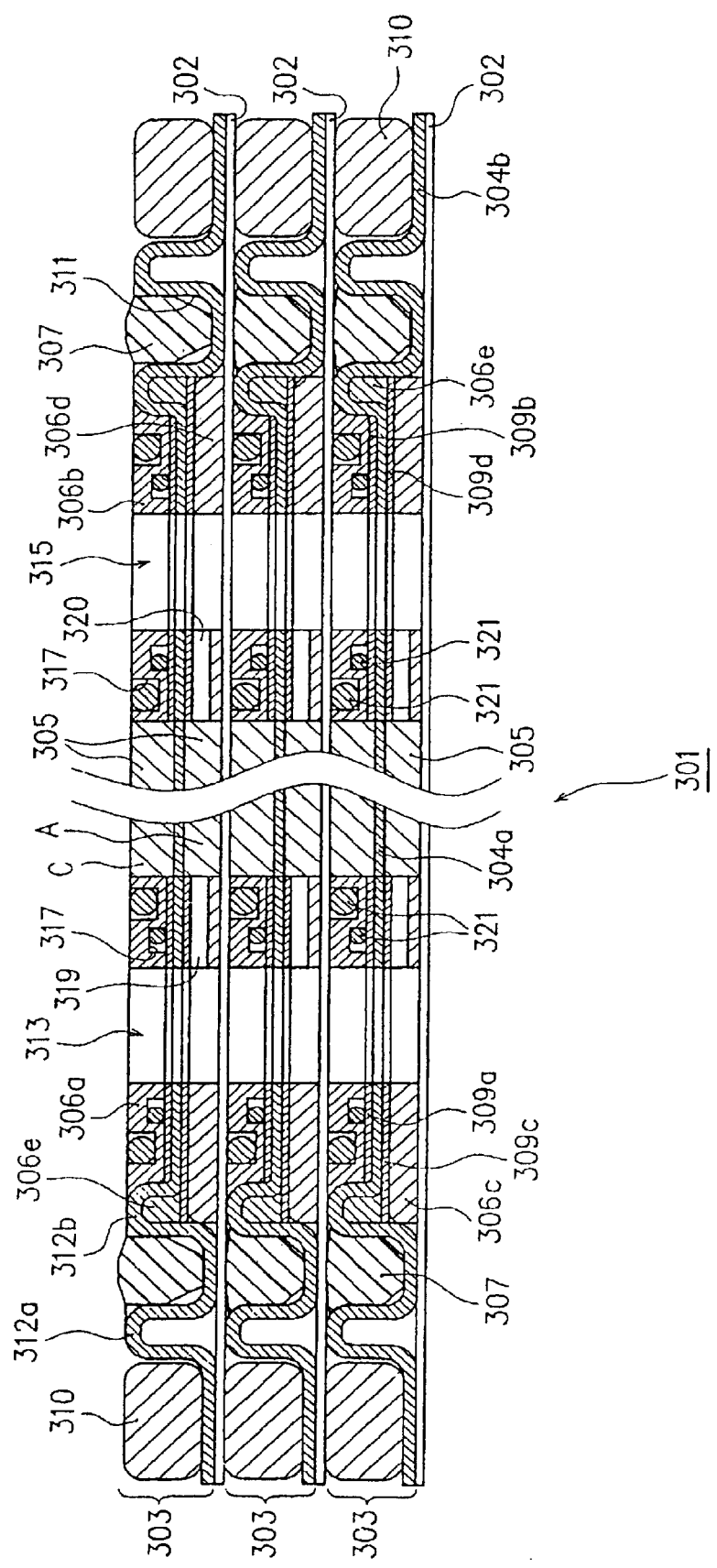
FIG. 19 is a cross section illustrating an essential portion of the cross-sectional view taken along line XIX—XIX in FIG. 18(a).
Figure 20:
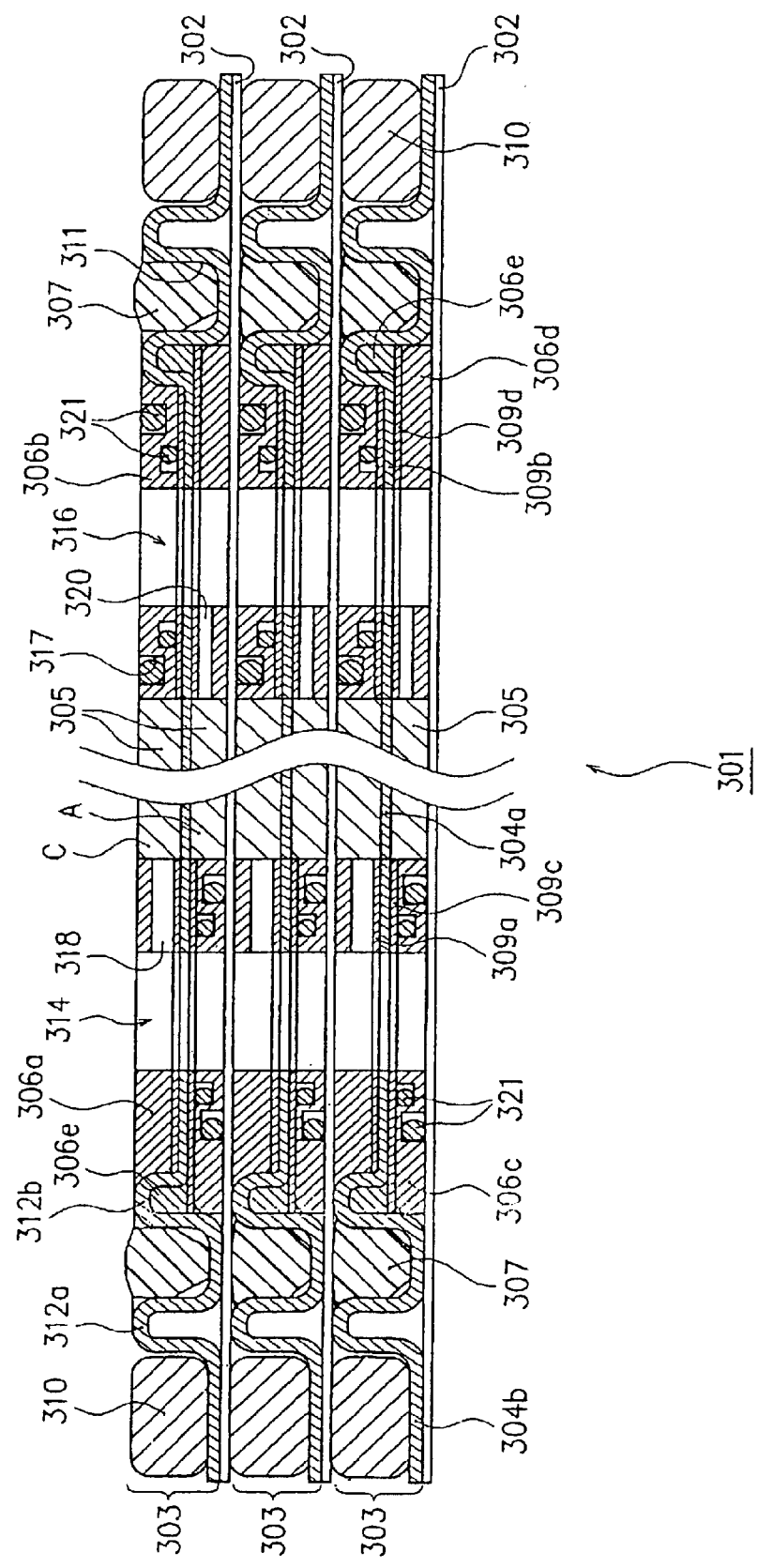
FIG. 20 is a cross section illustrating an essential portion of the cross-sectional view taken along line XX—XX in FIG. 18(a).
Figure 21:
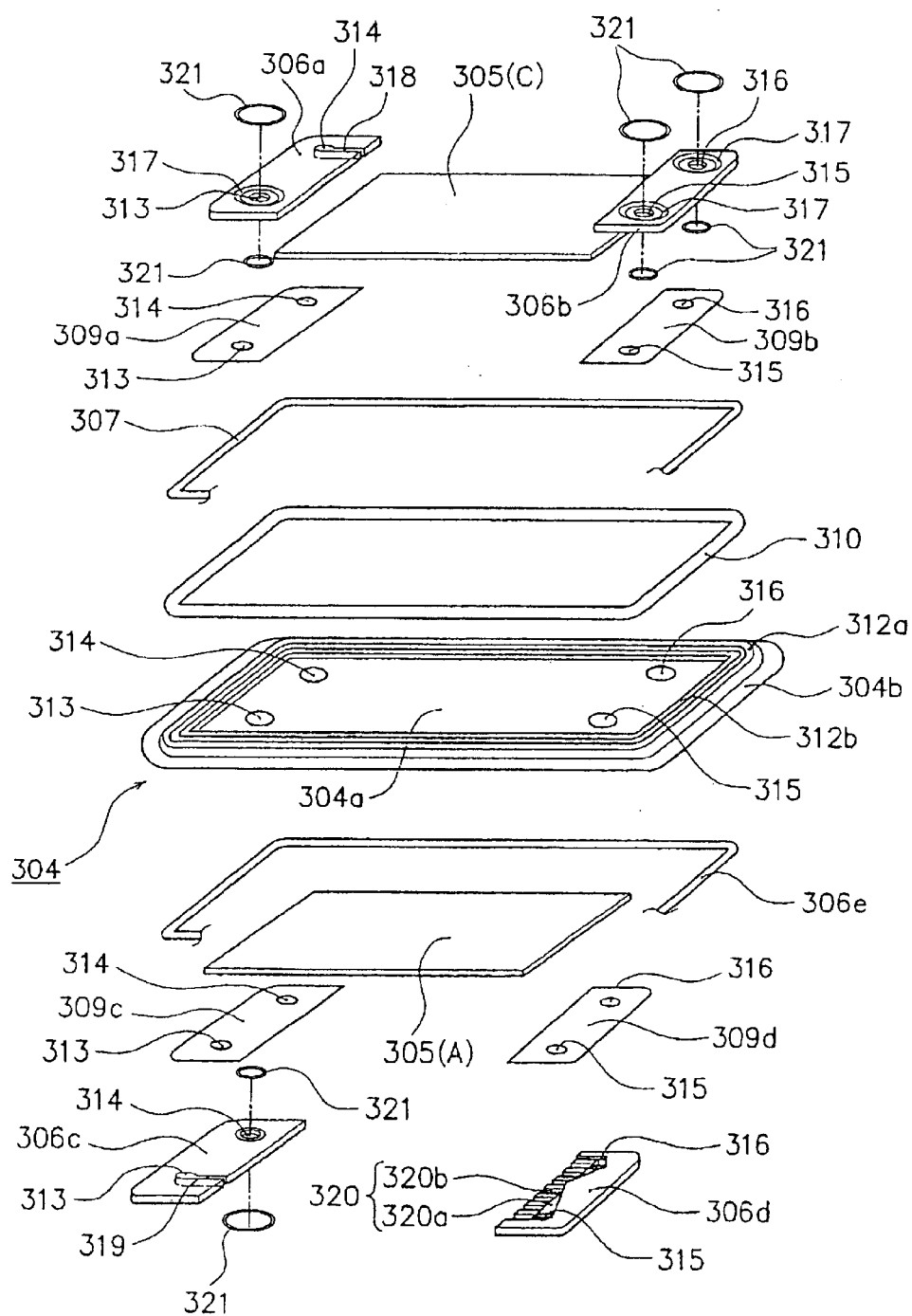
FIG. 21 is a disassembled perspective view of an electrode plate unit constituting one embodiment of the electrochemical cell according to third and fourth aspects of the present invention.

FIGS. 18 are schematic views of electrochemical cell 301 according to this embodiment, in which FIG. 18(a) is a plane view of the electrochemical cell 301, and FIG. 18(b) is a side view with a portion of FIG. 18(a) in section taken along line XVIII—XVIII in FIG. 18(a). FIG. 19 is a cross section illustrating an essential portion of the cross-sectional view taken along line XIX—XIX in FIG. 18(a). FIG. 20 is a cross section illustrating an essential portion of the cross-sectional view taken along line XX—XX in FIG. 18(a). FIG. 21 is a disassembled perspective view of an electrode plate unit constituting the electrochemical cell of this embodiment. The electrochemical cell 301 of this embodiment is formed by using the electrode plate units as illustrated in FIG. 21 and hereinafter-described solid electrolyte membranes and the like.

The electrochemical cell 301 as illustrated in FIGS. 18-20 includes the solid electrolyte membranes 302 and electrode plate units 303 arranged in a stacked arrangement. That is, the electrochemical cell 301 is made up by a predetermined number of the solid electrolyte membranes 302 and the electrode plates units 303 aligned in a stacked arrangement with each solid electrolyte membrane 302 held by adjacent electrode plate units 303. The electrochemical cell 301 is made up by providing end plates 322 on the opposite sides of a stacked member of a predetermined number of the solid electrolyte membranes 302 and the electrode plate units 303, and fastening the same by fastening bolts 323.

In the electrochemical cell 301 of this embodiment, nuts 324 each are attached to each fastening bolt 323 via a plurality of coned disc springs. For assembling the electrochemical cell, after aligning the solid electrolyte membranes 302, the electrode plate units 303, etc., in a stacked arrangement, they are fastened together by the fastening bolts 323 or the like while being fastened by a pressing machine.

The electrode plate units 303 each are formed by porous electric current supplier 305, spacer 306, sealing member 307 and the like disposed on each side of electrode plate 304 of a titanium plate. As will be described later, the spacers 306 and the like form therein oxygen hole 313 for taking out generated oxygen gas, hydrogen hole 314 for taking out generated hydrogen gas, and demineralized water holes 315, 316 for feeding demineralized water used for electrolysis.

Now, the description will be made in detail for the electrode plate 304 and its peripheral structure by referring to FIG. 21.

The electrode plate 304 is formed by plate portion 304a as an inner portion, peripheral edge portion 304b disposed around the outer periphery of this plate portion 304a, and the like. Between the plate portion 304a and the peripheral edge portion 304b are formed outer raised line 312a and inner raised line 312b. That is, groove 311 for the sealing member 307 is formed along the inner edge of the peripheral edge portion 304b by bending. The electrode plate is bent on the inner side and outer side of this groove 311 to form the outer raised line 312a and the inner raised line 312b extending along the groove 311.

The electrode plate 304 can be formed by pressing a titanium plate preferably having a thickness of 0.3–0.8 mm and more preferably 0.5–0.6 mm. A particular area of the electrode plate 304 which contacts (and may contact) an adjacent one when aligning the electrode plate units 303 in a stacked arrangement is coated for electrical isolation. For example, the bottom of the groove 311 for sealing member is coated with Teflon (polytetrafluoroethylene).

Porous electric current suppliers 305(A) and 305(C) are disposed on the center portions of the electrode plate 304 on the opposite sides thereof, while the spacers 306 are disposed on the opposite sides of each porous electric current supplier 305. In the spacers 306, lower spacers 306c, 306d are formed larger than upper spacers 306a, 306b.

Annular spacer 306e is fitted into a dead space on the rear side (lower side) of the inner raised line 312b. The electrode plate 304 and the spacers 306 form at corresponding positions thereof fluid passage holes (oxygen holes 313, hydrogen holes 314, demineralized water holes 315, 316). Specifically, as illustrated in FIGS. 19-21, the oxygen holes 313 and the hydrogen holes 314 are formed in predetermined portions of the spacers 306a, 306c on the left hand side of the electrode plate 304 and the corresponding positions of the electrode plate 304, while the demineralized water holes 315, 316 are formed in predetermined portions of the spacers 306b, 306d on the right hand side of the electrode plate 304 and the corresponding positions of the electrode plate 304.

In FIGS. 19-21, a space on the upper side of the electrode plate 304 is designated as the hydrogen generating chamber C, while a space on the lower side is designated as the oxygen generating chamber A. The sealing member 307 for sealing the hydrogen generating chamber C and the oxygen generating chamber A from the outside is fitted into the groove 311 formed on the electrode plate 304 by bending.

As illustrated in FIGS. 19-21, O-ring groove 317 is formed around the oxygen hole 313 on the lower surface of the spacer 306c on the upper and left hand side of the electrode plate 304, and hydrogen groove 318 is formed extending from the hydrogen hole 314 to an edge facing an adjacent porous electric current supplier. Another O-ring groove 317 is also formed around the oxygen hole 313 on the upper surface of this spacer 306a.

O-ring groove 317 is formed around the hydrogen hole 314 on the upper surface of the spacer 306c on the lower and left hand side of the electrode plate 304, and oxygen groove 319 is formed extending from the oxygen hole 313 to an edge facing an adjacent porous electric current supplier 305. Another O-ring groove 317 is also formed around the hydrogen hole 314 on the lower surface of this spacer 306c.

Another O-ring groove 317 is also formed around the demineralized water holes 315, 316 on the upper and lower surfaces of the spacer 306b on the upper and right hand side of the electrode plate 304. Demineralized water groove 320 is formed extending from the demineralized water holes 315, 316 on the upper surface of the spacer 306d on the lower and right hand side of the electrode plate 304 to an edge facing the porous electric current supplier 305. O-rings 321 are respectively fitted into the O-ring grooves 317.

The demineralized water groove 320 formed on the spacer 306d on the lower and right hand side is formed into a shape different from the hydrogen groove 318 and the oxygen groove 319 formed on the other spacers 306a, 306c. That is, the hydrogen groove 318 and the oxygen groove 319 are respectively formed from the hydrogen holes 314 and the oxygen holes 313 as independent single grooves.

At the same time, the demineralized water groove 320 is formed by widened recess section 320a for connection with the two demineralized water holes 315, 316 and small groove sections 320b extending from this recess section 320a to an edge facing the porous electric current supplier 305. The recess section 320a and the small groove sections 320b of the demineralized water groove 320 are formed in a substantially sector shape for having demineralized water as electrolyzed water running through the porous electric current supplier 305 as equal as possible.

In this embodiment, for the purpose of improving the strength or other purposes, the spacers 306 are formed by using metal such as titanium, and therefore insulating sheets 309a, 309b, 309c, 309d having sizes adapted to those of the spacers 306a, 306b, 306c, 306d are provided between the respective spacers 306 and the electrode plate 304. These insulating sheets 309 each form in predetermined (corresponding) positions thereof fluid passage holes (oxygen holes 313, hydrogen holes 314, demineralized water holes 315, 316).

Also, the electrochemical cell 301 of this embodiment is designed so as to have shim 310 disposed along the peripheral edge portion 304b, a part of the electrode plate 304 (outer periphery of the plate portion 304a and outer periphery of the outer raised line 312a).

Figure 22:
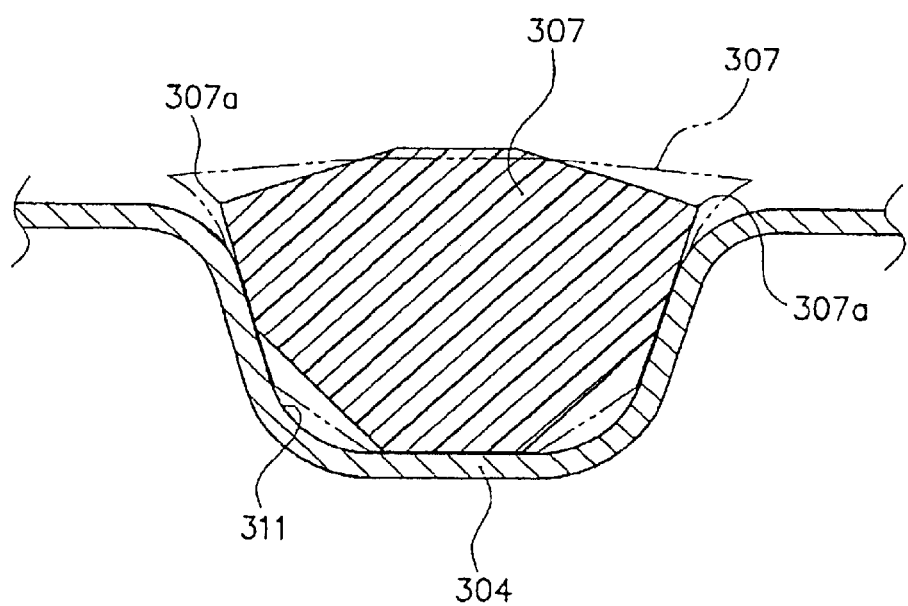
FIG. 22 is an enlarged cross section of a sealing member constituting one embodiment of the electrochemical cell according to the third and fourth aspects of the present invention.

FIG. 22 is an enlarged cross section of the sealing member 307 constituting the electrochemical cell 301 of this embodiment, in which the sealing member 307 has a so-called diamond shape in cross section as illustrated in FIGS. 19, 20 and 22.

The thus arranged electrochemical cell 301 according to this embodiment can produce desirable effects as stated below.

That is, the electrochemical cell 301 of this embodiment, which has shims 310 having a predetermined thickness inserted into clearances (onto the peripheral edge portions 304b) extending throughout the outer peripheries of the multistacked electrode plates 304, enables equal clearances between the adjacent electrode plates 304, thereby enabling a predetermined fastening pressure on the surfaces of the solid electrolyte membranes 302 and the porous electric current suppliers 305, and hence equally applied pressure on the whole surfaces.

Generally, sealing members or the like as elastic members are provided in each electrode plate 304 for the prevention of fluid leakage or the like. Since these sealing members have non-uniform compression rate, the clearances between the adjacent electrode plates 304 tend to become non-uniform. However, the shims 310 disposed on the respective electrode plates 304 can easily maintain uniform clearances since they have a predetermined rigidity.

As a material for forming the shims 310, it can be cited synthetic resins such as plastic having a predetermined heat resistance (such a property as to be tolerable against the temperature of about 80° C.) and insulating property, ceramics, and metal coated with an insulating material. Such a material combined with the insulating property can securely achieve the isolation between the adjacent electrode plates. Among those materials, synthetic resins (e.g., PFA, PTF) are particularly preferable in light of workability and cost (fabricability at low cost) and the like.

In this embodiment, the description was made by taking the case where the shim extends the whole periphery of each electrode plate 304. However, the present invention is not necessarily limited to this arrangement. It is possible to employ an arrangement where shims are respectively disposed along four sides of each electrode plate 304 if necessary.

The spacers 306 constituting the electrochemical cell 301 of this embodiment are formed by using metal such as titanium and stainless steel. If these spacers 306 are formed by using resin or the like, they have poor mechanical strength and thermal resisting property, which may invite the leakage due to differential pressure between the hydrogen side and the oxygen side. However, as described in this embodiment, the spacers. made of metal can improve both the mechanical strength and the thermal resisting property, avoiding the leakage or the like due to the differential pressure between the hydrogen side and the oxygen side.

In this embodiment, the insulting sheets 309 are interposed between the spacers 306 and each electrode plate 304 in order to secure insulation between the adjacent electrode plates 304. The insulating sheets 309 are needed when the spacers 306 made of metal are used as in this embodiment, or the electrode plates 304 are not subjected to particularly, resin coating (insulating coating) or the like.

The sealing members 307 constituting the electrochemical cell 301 of this embodiment each have a so-called diamond shape in cross section, as illustrated in FIGS. 19, 20, and 22. The sealing members 30 having such a shape each is deformed as illustrated in imaginary line (chain double-dashed line) in FIG. 22 by the application of compression force from the above when assembling the electrochemical cell 301. Specifically, upon receiving compression force, the sealing members 307 each are deformed with shoulder portions 307a, 307a thereof protruding towards the opposite directions (see FIGS. 19, 20, and 22). When using a conventional sealing member such as a commonly used O-ring, hexagonal ring or octagonal ring, they are deformed, protruding outwardly from the electrochemical cell when the pressure within the electrochemical cell becomes high, and such deformation may lead to the leakage of demineralized water. However, the sealing members 307 of this embodiment (the sealing members 307 having a diamond shape in cross section) each are deformed with both the shoulder portions 307a, 307a flaring towards the inside and outside of the electrochemical cell 301 (see a portion represented by the imaginary lines in FIG. 22), self-tightening action through this flaring enables the sealing members 307 to withstand high pressure as a result of pressure increase within the electrochemical cell, so that the leakage of hydrogen, oxygen and demineralized water can be prevented.

That is, the sealing members 307 fitted into the grooves 311 each are pressed by the bottom of the groove 311 of an adjacent (upper) electrode plate 304. Accordingly, the sealing effect is exhibited by the pressing force and inner pressure within the sealed grooves 311. As a result, unlike the conventional gaskets of a flat plate shape, the sealing members are unlikely to outwardly protrude or cause creep.

As materials for forming the sealing members 307, materials having a relatively rich elasticity such as rubber and synthetic resin (e.g., Teflon (polytetrafluoroethylene)) are used.

The shape of the sealing members 307 is not limited to a diamond shape. Rather, any shape can be employed, provided that a predetermined portion of each sealing member 307 protrudes towards the inner side and outer side of the electrochemical cell 301. Accordingly, a reversed trapezoidal shape or the like may be employed.

For assembling the electrochemical cell 301 of this embodiment, after aligning the solid electrolyte membranes 302, the electrode plate units 303 and the like in a stacked arrangement, they are fastened together by the fastening bolts 323 or the like while being fastened by a pressing machine. According to a conventional technique, several bolts were fastened by using a torque wrench or the like, friction resistance of the bolts, uneven fastening or the like made it very difficult to apply a predetermined fastening pressure on the surfaces of the electric current supplier and the solid electrolyte membrane, and have fastening pressure uniformed throughout the whole surfaces of the same. However, according to this embodiment, a predetermined fastening pressure can easily be applied on the surfaces of the electric current supplier and the solid electrolyte membrane by using a pressing machine when assembling the electrochemical cell 310, and uniformizing of the fastening pressure throughout the whole surfaces can relatively easily be achieved.

In the electrochemical cell 301 according to this embodiment, nut 324 is attached to each fastening bolt 323 via the plural coned disc springs 325. Accordingly, in this embodiment, the coned disc springs 325 attached to each fastening bolt 323 apply biasing force to the bolt 323 and the nut 325. As a result, even if this electrochemical cell 301 is used for a long period of time, the fastening pressure on the surfaces and the like originally imparted can effectively be maintained by imparting biasing force to the fastening bolts 323 and the nuts 325 via the coned disc springs attached to the bolts 323. That is, these coned disc springs 325 act as a buffer means for compensating thermal expansion, thermal contraction or the like that occurs in the electrochemical cell 301 (electrode plates 304 or the like constituting the electrochemical cell 301).

Herein, the description was made for the case where the coned disc springs 325 are used as the buffer means. However, the present invention is not necessarily limited to this arrangement. For example, coil springs, air pressure, hydraulic cylinders or the like may be used. The coned disc springs and the coil springs are suitable as buffer means because of easy availability and lower prices of those having a desirable elasticity (spring coefficient), achieving easy fastening operation and compactness.

In this embodiment, the description was made for the case where the spacers 306 each are integrally formed by using metal. However, the present invention is not necessarily limited to this arrangement. For example, spacers may be formed having an arrangement as illustrated in FIG. 23.

Figure 23A:
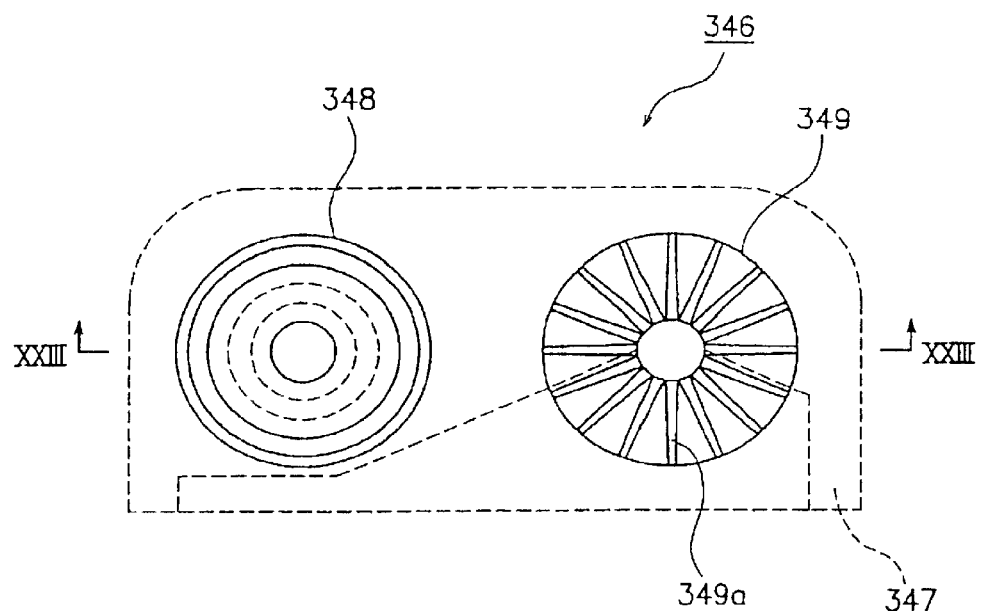
FIG. 23 are schematic views of another spacer constituting one embodiment of the electrochemical cell according to the third and fourth aspects of the present invention.
Figure 23B:
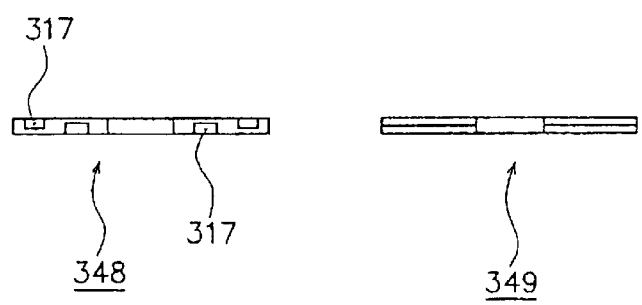

Spacer 346 as illustrated in FIG. 23 includes body portion 347 made of Teflon (polytetrafluoroethylene) (represented by the broken lines in FIG. 23), first reinforcing plate 348 and second reinforcing plate 349 each having a shape adapted to be fitted into this body portion 347. FIG. 23(a) is a plane view of the spacer 346 formed by using the body portion 347 and the reinforcing plate 348, and FIG. 23(b) is a cross section of essential portions of the reinforcing plates 348, 349 taken along line XXIII—XXIII in FIG. 23(a). The body portion 347 forms therein through-holes for fittingly receiving the reinforcing plates 348, 349. The respective reinforcing plates 348, 349 are formed by using metal such as titanium or stainless-steel. The first reinforcing plate 348 forms thereon O-ring groove 317, while the second reinforcing plate 349 forms thereon passage grooves 349a, through which oxygen, hydrogen and demineralized water pass.

As described above, the spacers 306 made of metal were used in the embodiment illustrated in FIGS. 18-22 in order to prevent the leakage due to the differential pressure between the hydrogen side and the oxygen side. In this regard, a portion where this leakage is most frequently caused is in the proximity of each through-hole formed on each spacer for fluid (oxygen or the like) distribution. Therefore, a rigid material such as metal may be used only for a portion where leakage is likely to be caused, if necessary. For this reason, in FIG. 23, only the portions in proximity of the through-holes for the fluid distribution are formed of metal, thereby achieving the spacer 346 that is capable of effectively preventing the leakage due to the differential pressure between the hydrogen side and the oxygen side.

In the electrochemical cell 301 having the above arrangement according to this embodiment, demineralized water is fed to the porous electric current supplier 305 on the lower side of the electrode plate 304, which acts as the oxygen generating chamber A, via the two demineralized water holes 315, 316 and the demineralized water groove 320. The O-rings 321 block the inflow of the demineralized water into the hydrogen generating chamber C. The oxygen gas generated in the oxygen generating chamber A is taken out via the oxygen groove 319 and the oxygen holes 313. The O-rings 321 block the inflow of the oxygen gas into the hydrogen generating chamber C. The hydrogen gas generated in the hydrogen generating chamber C is taken out via the hydrogen groove 318 and the hydrogen holes 314. The O-rings 321 block the inflow of the hydrogen gas into the oxygen generating chamber A. It is a matter of course that the generated oxygen and hydrogen gases are prevented from leaking to the outside via a portion between the adjacent electrode plate units 303.

In assembling the electrochemical cell 301 by using the electrode plate units 303 of this embodiment, the porous electric current suppliers 305 and the spacers 306 are previously fitted into spaces formed on each electrode plate 304, and the sealing member 307 and the O-rings 321 are also respectively fitted into the grooves 311, 317. That is, the respective parts such as the porous electric current suppliers 305 and the spacers 306 are inevitably placed in position according to the spaces formed on each electrode plate 304. Therefore, the assembling process can remarkably be simplified according to the electrochemical cell of this embodiment, when comparing it with the electrochemical cell of the conventional technique.

As illustrated in FIG. 18, the electrochemical cell 301 of this embodiment forms a rigid peripheral wall by fastening the fastening bolts 323, producing a strength enough to withstand a high pressure within the cell.

As the solid electrolyte membrane 302 constituting the electrochemical cell 301 of this embodiment, a so-called solid polymer electrolyte membrane, which is formed by forming porous layers of catalytic electrode formed from metal of the platinum group or the like on the opposite side surfaces of an ionic conductive polymer membrane by electroless plating, hot pressing or the like, is used. Since this solid polymer electrolyte membrane is relatively soft, it is likely to be damaged by the pressure increase on its surface contacting the porous electric feeding membrane 305. However, by using the shims 310 and the like, the electrochemical cell of this embodiment can achieve the uniformizing of the fastening pressure on the surfaces, and hence maintain the stabilized water electrolysis without damaging the solid electrolyte membranes 302.

Figure 24C:
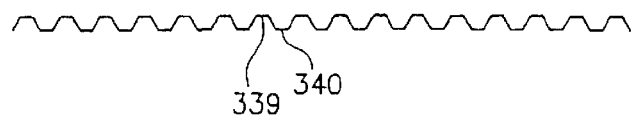
FIG. 24 are respectively schematic views of an electrode plate constituting another embodiment of the electrochemical cell according to the third and fourth aspects of the present invention.
Figure 24A:
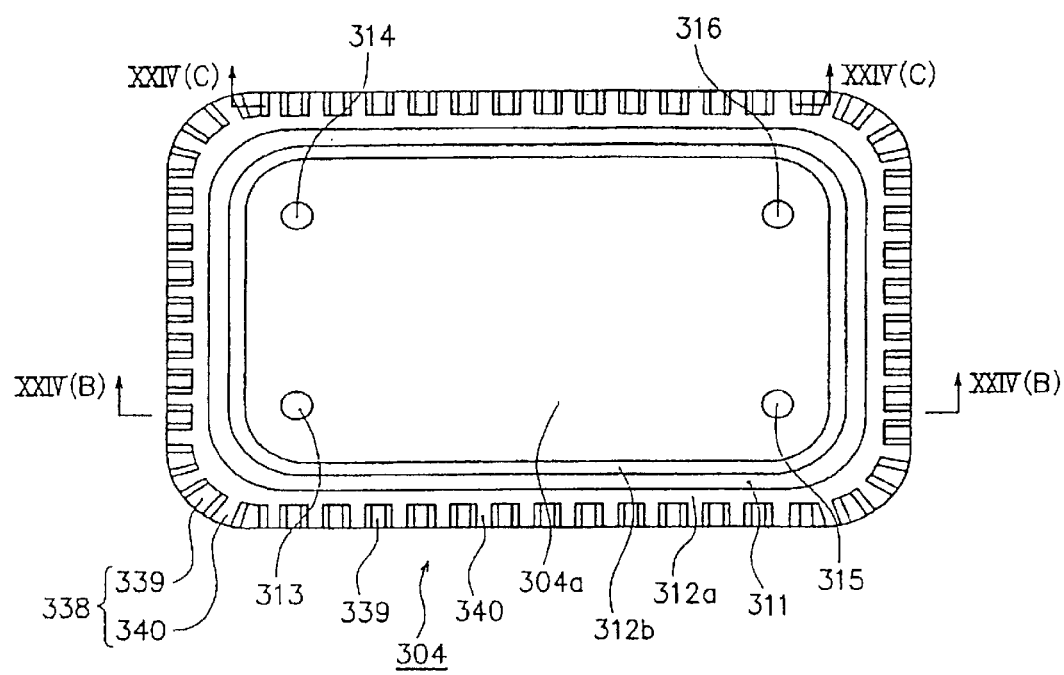
Figure 24B:
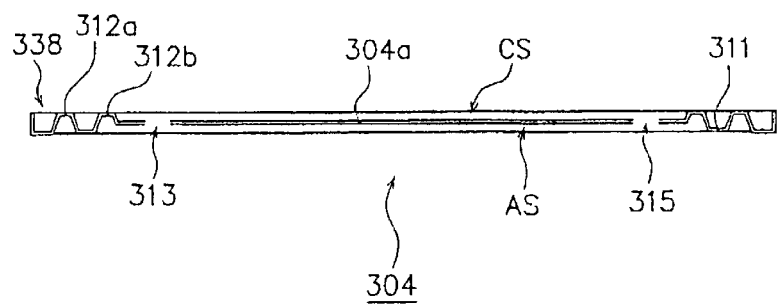
Figure 25:
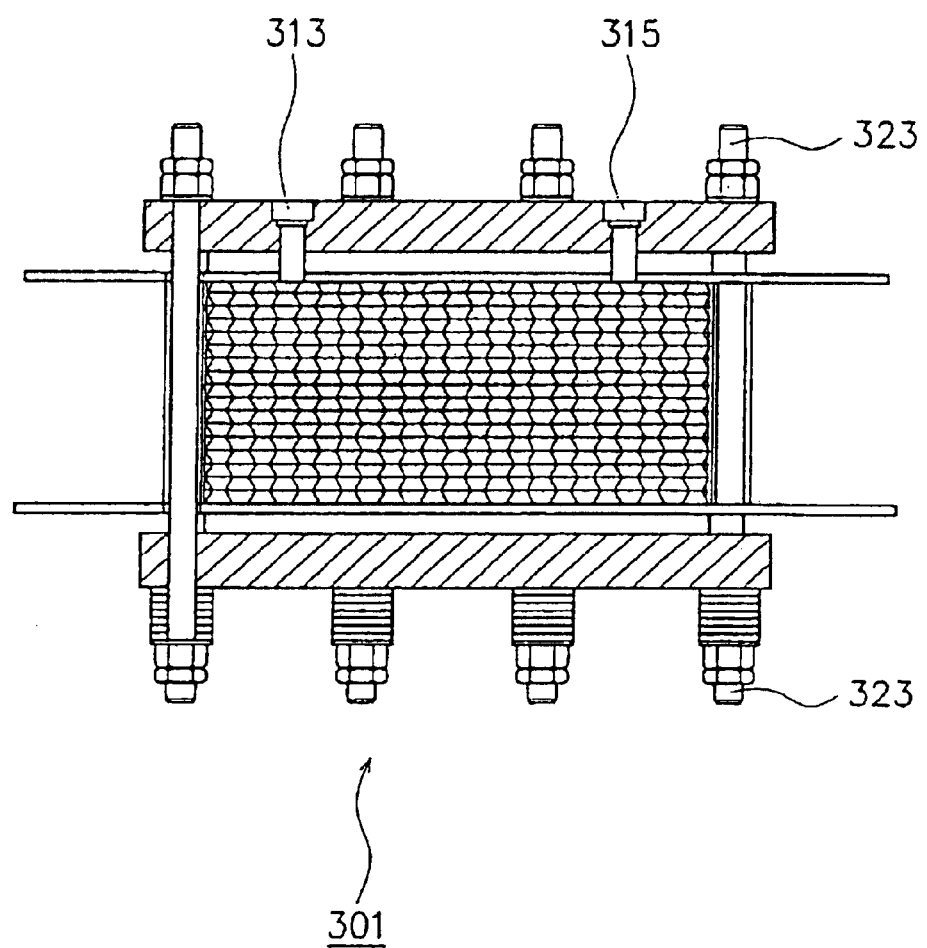
FIG. 25 is a schematic view of the electrochemical cell equipped with the electrode plate of FIG. 24 according to another embodiment.

The electrochemical cell 301 of this embodiment was described by taking for example the case where it uses the electrode plates 304 each having the peripheral edge portion 304b shaped into a flat plate. However, the present invention is not necessarily limited to this arrangement. For example, the electrode plates 304 each may be formed in a shape as illustrated in FIGS. 23. Herein, FIG. 24(a) is a plane view illustrating the electrode plate according to another embodiment of the third and fourth aspects of the present invention. FIG. 24(b) is a cross section taken along line XXIV(B)—XXIV(B) in FIG. 24(a). FIG. 24(c) is a cross section taken along line XXIV(C)—XXIV(C) in FIG. 24(a). FIG. 25 is a schematic view of the electrochemical cell formed by using the electrode plates 304 as illustrated in FIGS. 24.

The electrode plate 304 of FIG. 24 has peripheral edge portion 338 that is bent to form recesses 339 and protrusions 340, those of which are alternately arrayed along a peripheral edge. Both the recesses 339 and the protrusions 340 have a shape formed by cutting an equilateral hexagon along the center line connected between the opposite corners (a kind of trapezoid) (see FIG. 24(c)). As is apparent from FIG. 24(a), the arrays of the recesses 339 and the protrusions 340 on the opposite sides of the peripheral edge portion 338 are offset from each other by a half-pitch from each other. Accordingly, by turning two electrode plates 304 having the same arrangement over each other by 180 degrees and overlapping the same to each other, any one of the recesses 339 of one electrode plate 304 faces one of the protrusions 340 of another electrode plate 304. By assembling the electrochemical cell 301 with the electrode plates 303 stacked in plural stages, alternately turned 180 degrees and overlapped to each other, the electrochemical cell 301 has a side portion formed with a honeycomb structure, that is, a three-dimensional hexagonal honeycomb structure, as illustrated in FIG. 25.

The recesses 339 and the protrusions 340 each are formed extending towards an inward side of the electrode plate 304 within a predetermined dimensional range, while the groove 311 for the sealing member 307 is formed by bending along an inner edge of the array of the recesses 339 and the protrusions 340 (along an inner edge of the peripheral edge portion 338). On the outward side and inward side of the groove 311 are formed the raised lines 312a, 312b along the groove 311. The flat plate portion 304a formed inwardly than the inner raised line 312b is positioned substantially along the center between the bottoms of the recesses 339 and the tops of the protrusions 340 in the thickness direction (see FIG. 24(b)). With this arrangement, tray-like space CS surrounded by the inner raised line 312b is formed on one side of the flat plate portion 304a, while another traylike space AS surrounded by the groove 311 is formed on the other side of the flat plate portion 304a (see FIG. 24(b)).

It is possible to form the electrode plate of the aforesaid embodiment (see FIGS. 18-22) and the herein-described electrode plate (see FIGS. 24 and 25) by pressing a titanium plate. Portions of these electrode plates contacting or likely to contact adjacent electrode plates in stacked arrangement are coated for electrical insulation. That is, the bottoms of the recesses 339, the tops of the protrusions 340, the top of the outer raised line 312a and the bottom of the groove 311 for the sealing member are coated with Teflon (polytetrafluoroethylene).

As described above, in forming the electrochemical cell 301 of FIG. 25 by using the electrode plates as illustrated in FIG. 24, the electrochemical cell 301 has a side portion formed with a honeycomb structure by the recesses 339 and the protrusions 340 of the electrode plates 304 (see FIG. 25), and the rigid peripheral wall of the electrochemical cell 301 can be formed by fastening the bolts 323. As a result, a strength enough to withstand high pressure within the cell can be produced. In addition, the side portion with the honeycomb structure can also have a proper elasticity effected by its material and shape, and therefore compensate increased contacting surface pressure due to the thermal expansion. This electrochemical cell 301 can be employed as a so-called high-pressure type hydrogen/oxygen generating device without using a known electrolysis tank and the like.

Also, as described above, since the solid polymer electrolyte membrane, which constitutes the electrochemical cell of this embodiment, is relatively soft, it is likely to be damaged if there causes high pressure on the surface contacting to the porous electric current supplier. However, the electrochemical cell 301 as illustrated in FIG. 25 can compensate pressure increase on the contacting surface due to the thermal expansion. As a result, the solid polymer electrolyte membrane is unlikely to be damaged, and hence stabilized water electrolysis can be maintained.

Where the spacers (made of metal or the like), sealing members (diamond shape in cross section), insulating sheets, shims and the like, which are used for forming the electrochemical cell as described with reference to FIGS. 18-22, are used for the electrochemical cell as illustrated in FIG. 25, the same effects as those in the embodiment as illustrated in FIGS. 18-22 can be produced.

Figure 26A:
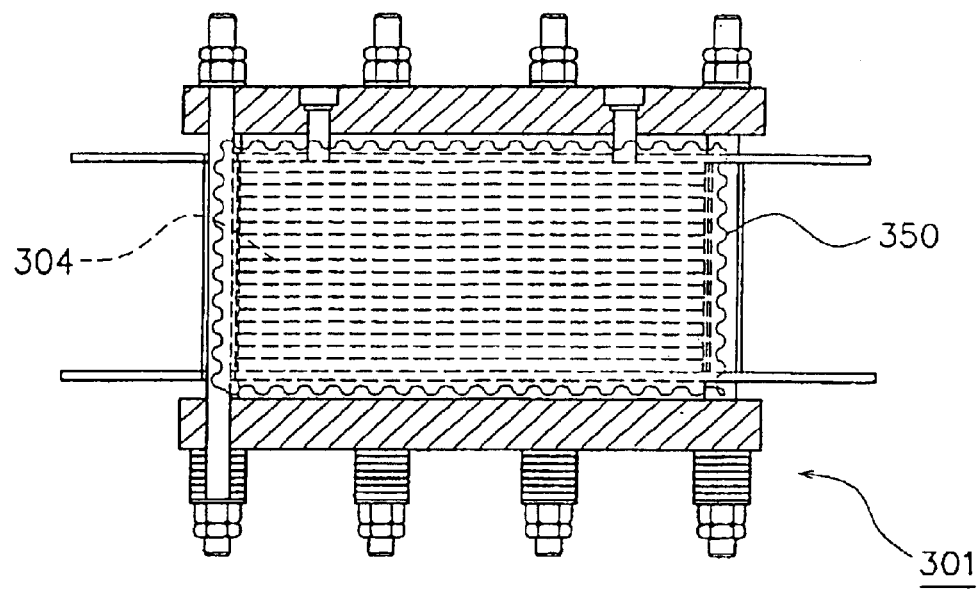
FIGS. 26(a) and 26(b) are schematic views of the electrochemical cell with a front side of the outer periphery of the electrode plate secured in position with a resin.
Figure 26B:
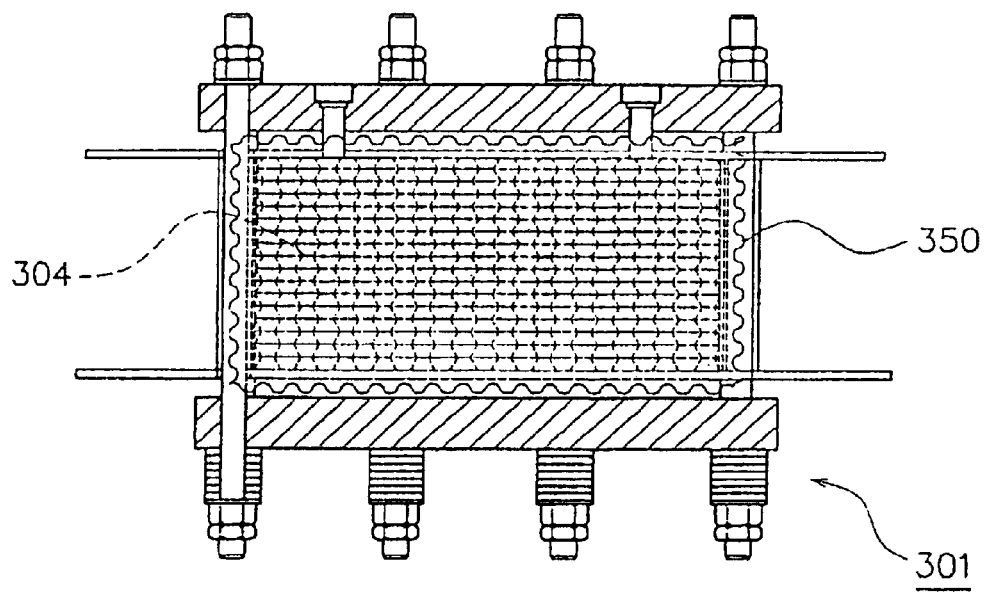
Figure 27:
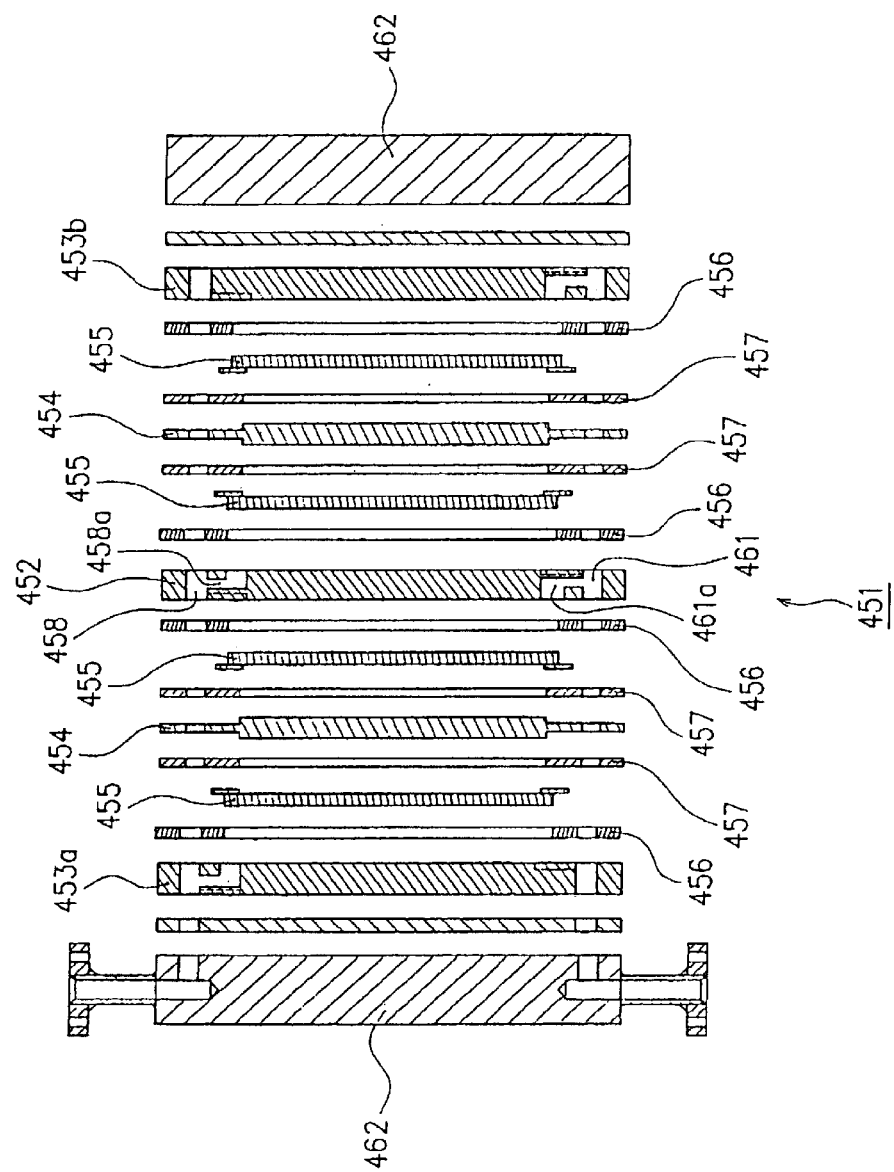
FIG. 27 is a disassembled cross section of the electrochemical cell according to the conventional technique.
Figure 28:
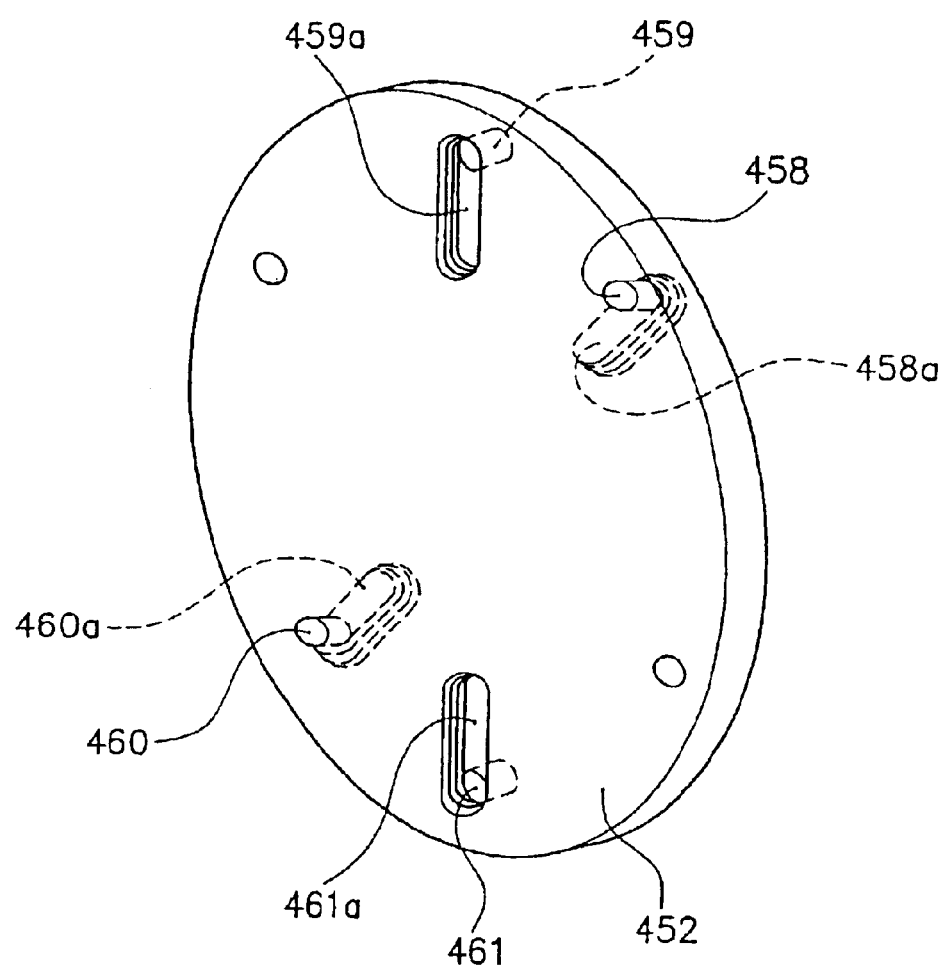
FIG. 28 is a perspective view illustrating one example of the bipolar electrode plate positioned at the intermediate portion of the conventional electrochemical cell.

FIGS. 26 are schematic views illustrating the electrode plates constituting the electrochemical cell of the present invention, which electrode plates having outer peripheries entirely secured in position with resin. FIG. 26(a) illustrates the electrochemical cell of the embodiment described with reference to FIG. 18 and other Figures, which has been secured in position with resin. FIG. 26(b) illustrates the electrochemical cell of the embodiment with reference to FIG. 25 and other Figures, which has been secured in position with resin.

Conventionally, the outer peripheries of the electrode plates constituting the electrochemical cell are open to the outside air, and therefore hydrogen, oxygen and demineralized water are likely to leak to the outside of the electrochemical cell due to deterioration of the sealing members between the electrode plates or the like. Also, there was a problem that the electrode plates open to the outside air has a poor weather resistance.

However, as illustrated in FIG. 26, with the electrode plates 304 having the outer peripheries entirely secured in position with resin, it is possible to prevent hydrogen, oxygen and demineralized water from leaking to the outside of the electrochemical cell 301. Also, the electrode plates 304 which are prevented from directly contacting the outside air, can achieve an improved weather resistance and hence long lifetime of the electrochemical cell 301.

What is claimed is:

1. An electrode plate for a water electrolysis device, which is formed from a metal plate and which comprises a flat plate portion, and a peripheral edge portion positioned on the outer side of the flat plate portion and bent so that recesses and protrusions are alternately arrayed along an outer peripheral edge thereof.

2. An electrode plate for a water electrolysis device according to claim 1, wherein the metal plate has such a thickness as to be capable of being press-formed.

3. An electrode plate for a water electrolysis device according to claim 1, wherein a groove for receiving a sealing member is formed between the flat plate portion and the peripheral edge portion along the peripheral portion by bending.

4. An electrode plate for a water electrolysis device according to claim 3, wherein the flat plate portion is positioned substantially along the center of the width of the electrode plate defined by bottoms of the recesses and tops of the protrusions.

5. An electrode plate unit comprising:
   an electrode plate formed from a mental plate and including a flat plate portion, a peripheral edge portion positioned on the outer side of the flat plate portion and bent so that recesses and protrusions are alternately arrayed along an outer peripheral edge thereof, and a groove formed by bending between the flat plate portion and the peripheral edge portion in such a manner as to extend along the peripheral edge portion;
   a sealing member mounted in the groove of the electrode plate;
   an anode-side electric current supplier and a cathode-side electric current supplier respectively disposed on the opposite sides of the flat plate portion of the electrode plate;
   anode-side spacers and cathode-side spacers, the former disposed with the a node-side electric current supplier positioned therebetween and the latter disposed with the cathode-side electric current supplier positioned therebetween as viewed in a plate view; wherein
   the electrode plate and both the spacers respectively form holes respectively forming an oxygen gas passage, a hydrogen gas passage and an electrolyzed water passage;
   the anode-side spacer has opposite side surfaces on which sealing grooves are respectively formed surrounding one of the holes, which forms the hydrogen gas passage; and
   the cathode-side spacer has opposite side surfaces on which sealing grooves are respectively formed surrounding those of the holes, which respectively form the oxygen gas passage and the electrolyzed water passage.

6. An electrode plate unit according to claim 5, wherein the metal plate has such a thickness as to be capable of being press-formed.

7. An electrode plate unit according to claim 5, wherein:
   the anode-side spacer has a side surface contacting the flat plate portion of the electrode plate, said side surface forming thereon an oxygen gas groove for connection between the hole forming the oxygen gas passage and the anode-side electric current supplier, and an electrolyzed water groove for connection between the hole forming the electrolyzed water passage and the anode-side electric current supplier; and
   the cathode-side spacer has a side surface contacting the flat plate portion of the electrode plate, said side surface forming thereon a hydrogen gas groove for connection between the hole forming the hydrogen gas passage and the cathode-side electric current supplier.

8. An electrochemical cell comprising cell comprising a plurality of the electrode plate units of claim 5 and solid electrolyte membranes interposed between adjacent ones of the electrode plate units, wherein the plurality of electrode plate units are aligned in a stacked arrangement, and an electrode plate of one of said adjacent electrode plate units has recesses and protrusions respectively facing protrusions and recesses of the opposite one of said adjacent electrode plate units.

9. An electrochemical cell comprising solid electrolyte membranes and electrode plates aligned in a stacked arrangement with the solid electrolyte membranes between the electrode plates, and electric current suppliers disposed between the solid electrolyte membranes and the electrode plates, wherein said electrochemical cell has a side portion having a honeycomb structure formed by a peripheral edge portions of the electrode plates.

10. A solid electrolyte membrane unit comprising a solid electrolyte membrane, a pair of electrode plates respectively disposed on the opposite sides of the solid electrolyte membrane, porous electric current suppliers respectively disposed between each of the pair of electrode plates and the solid electrolyte membrane, an anode-side annular membrane and a cathode-side annular member respectively forming therein center holes for receiving the porous electric current suppliers and defining an anode chamber and a cathode chamber on the opposite sides of the solid electrolyte membrane, and seal rings for isolating the anode chamber and the cathode chamber from the outside,
   wherein at least portions of the anode-side annular member and the cathode-side annular member contracting the solid electrolyte membrane possess acid resisting property; and
   wherein the seal rings are disposed in seal ring grooves formed on side surfaces of the anode-side annular member and the cathode-side annular member.

11. A solid electrolyte membrane unit according to claim 10, wherein the solid electrolyte membranes, the electrode plates and the annular members respectively have peripheral edge portions positioned radially outward than the porous electric current suppliers, the peripheral edge portions respectively forming therein first to third openings forming fluid conduits for feeding demineralized water, taking out oxygen gas and taking out hydrogen gas;
   wherein the anode-side annular member forms therein first and second fluid passages respectively for connection between the first opening and the anode chamber and between the second opening and the anode chamber; and wherein the cathode-side annular member forms therein a third fluid passage for connection between the third opening and the cathode chamber.

12. A solid electrolyte membrane unit according to claim 11, wherein the first and second fluid passages are formed on one side surface of the anode-side annular member, and the third fluid passage is formed on one side surface of the cathode-side annular member.

13. A solid electrolyte membrane unit according to claim 11, wherein:
the sealing grooves of the anode-side annular member are respectively formed on opposite side surfaces of the anode-side annular member so as to pass on the radially outer side of the first and second openings, and on the radially inner side of the third opening,
the anode-side annular member forms on opposite side surfaces thereof sealing grooves of smaller diameter, surrounding the third opening, and seal rings of smaller diameter are respectively fitted in the sealing grooves of smaller diameter;
the sealing grooves of the cathode-side annular member are formed on opposite side surfaces of the cathode-side annular member so as to pass on the radially inner side of the first and second openings, and on the radially outer side of the third opening;
the cathode-side annular member forms on opposite side surfaces thereof sealing grooves of smaller diameter, respectively independently surrounding the first and second openings, and seal rings of smaller diameter are respectively fitted in the sealing grooves of smaller diameter; and
at least some of the seal rings fitted in the sealing grooves of the anode-side annular member and the cathode-side annular member contacting the solid electrolyte membrane possess acid resisting property.

14. A solid electrolyte membrane unit according to claim 11, wherein
the sealing grooves of the annular members are respectively formed on opposite side surfaces of the annular members so as to pass on the radially outer side of the first to third openings;
the anode-side annular member forms on opposite sides thereof sealing groves of smaller diameter, surrounding the third opening, and seal rings of smaller diameter are respectively fitted in the sealing grooves of smaller diameter;
the cathode-side annular member forms on opposite side surfaces thereof sealing grooves of smaller diameter, respectively independently surrounding the first and second openings, and seal rings of smaller diameter are respectively fitted in the sealing grooves of smaller diameter; and
at least some of the seal rings fitted in the sealing grooves of the anode-side annular member and the cathode-side annular member contracting the solid electrolyte membrane possess acid resisting property.

15. A solid electrolyte membrane unit according to claim 10, wherein:
the porous electric current suppliers respectively have porous bodies and reinforcing rings radially outwardly extending from the porous bodies;
at least portions of the porous bodies and the reinforcing rings contracting the solid electrolyte membrane possess acid resisting property.

16. A solid electrolyte membrane unit according to claim 10, wherein:
the center hole of the anode-side annular member has a rectangular shape with a substantially equal width throughout the length from the first opening to the second opening; and
one of the porous electric current suppliers received within the center hole of the anode-side annular member has substantially the same shape as that of the center hole.

17. An electrolysis unit, wherein a plurality of solid electrolyte membrane units according to claim 10 are interconnected with each other in tandem.

18. An electrochemical cell comprising a solid electrolyte membrane, electrode plates disposed on the opposite sides of the solid electrolyte membrane, electric current suppliers interposed between the solid electrolyte membrane and the electrode plates, and shim disposed between the electrode plates so as to adjust contacting relationship between the solid electrolyte membrane and the electric current suppliers.

19. An electrochemical cell according to claim 18, wherein each of the shims is formed into an edgeless-shape so as to extend throughout the whole peripheral edge portion of each of the electrode plates.

20. An electrochemical cell according to claim 18, wherein the shims are respectively disposed on opposite sides of each of the electrode plates along the peripheral edge portion thereof.

21. An electrochemical cell according to claim 18, wherein the solid electrolyte membrane, the electrode plates, the electric current suppliers and the shims are aligned in a stacked arrangement between two end plates, the end plates are fastened to each other by using bolts and nuts adapted to the bolts, and buffer members exerting biasing forces are provided between the nuts and the end plates.

22. An electrochemical cell according to claim 21, wherein the buffer members each comprise at least one of a coned disc spring and a coil spring.

23. A method of assembling the electrochemical cell comprising aligning a solid electrolyte member, electrode plates, electric current suppliers and shims in a stacked arrangements between two end plates, and fastening between the two end plates by bolts while applying a uniform pressing force on the end plates by a pressing machine.

24. A method of assembling an electrochemical cell according to claim 23, wherein nuts adapted to the bolts and buffer members exerting biasing forces disposed between the nuts and the end plates are used in the step of fastening by the bolts.

25. An electrochemical cell comprising a solid electrolyte membrane, electrode plates disposed on the opposite sides of the solid electrolyte membrane, and electric current suppliers interposed between the solid electrolyte membrane and the electrode plates, wherein
the electrode plates respectively form on portions in proximity of the peripheral edge portions thereof recessed grooves in which sealing members are disposed; and
the sealing members disposed in the grooves are shaped to have predetermined portions adapted to protrude from the grooves towards the inner side and outer side of the electrochemical cell when the electrode plates are aligned in a stacked arrangement via the sealing members.

26. An electrochemical cell according to claim 25, wherein the sealing members are formed so as to have shoulder portions adapted to protrude towards the inner side and outer side of the electrochemical cell, when the sealing members have been fitted into the grooves.

27. An electrochemical cell according to claim 25, wherein the sealing members have a diamond shape or reversed trapezoidal shape in cross section.

28. An electrochemical cell according to claim 25, wherein shims are provided between the electrode plates so as to adjust contacting relationship between the solid electrolyte membrane and the electric current suppliers.

29. An electrochemical cell according to claim 25, wherein the solid electrolyte membrane, the electrode plates, the electric current suppliers and the shims are aligned in a stacked arrangement between two end plates; and the end plates are fastened to each other by using bolts and nuts adapted to the bolts, while buffer members exerting biasing forces are provided between the nuts and the end plates.

30. An electrochemical cell according to claim 29, wherein the buffer members each comprise at least one of a coned disc spring and a coil spring.

31. An electrochemical cell comprising a solid electrolyte membrane, electrode plates disposed on the opposite sides of the solid electrolyte membrane, and electric current suppliers interposed between the solid electrolyte membrane and the electrode plates, wherein the electrode plates respectively have outer peripheries secured to each other with a resin material.

32. An electrochemical cell according to claim 31, wherein the resin material is at least one selected from the group consisting of epoxy resin, polyester resin and silicone resin.

* * * * *

UNITED STATES PATENT AND TRADEMARK OFFICE
CERTIFICATE OF CORRECTION

PATENT NO. : 6,852,205 B1
DATED : February 8, 2005
INVENTOR(S) : Manabu Toyoshima et al.

It is certified that error appears in the above-identified patent and that said Letters Patent is hereby corrected as shown below:

Title page,
Item [73], Assignee, please correct as follows:
-- Shinko Pantec Co., Ltd. --.
Item [87], PCT Pub. Date, should read -- April 5, 2001 --.

Signed and Sealed this

Sixteenth Day of August, 2005

JON W. DUDAS
*Director of the United States Patent and Trademark Office*

UNITED STATES PATENT AND TRADEMARK OFFICE
CERTIFICATE OF CORRECTION

PATENT NO. : 6,852,205 B1
APPLICATION NO. : 10/089004
DATED : February 8, 2005
INVENTOR(S) : Manabu Toyoshima et al.

It is certified that error appears in the above-identified patent and that said Letters Patent is hereby corrected as shown below:

On the Title page (item 54) and Column 1, Line 1-4
--Electrode Plate for Water Electrolysis Device, Electrode Plate Unit, Solid Electrolyte Membrane Unit, and Electrochemical Cell--

Signed and Sealed this

Nineteenth Day of September, 2006

JON W. DUDAS
*Director of the United States Patent and Trademark Office*